United States Patent
Yamada et al.

(10) Patent No.: US 7,481,130 B2
(45) Date of Patent: Jan. 27, 2009

(54) VEHICLE STEERING TELESCOPIC SHAFT

(75) Inventors: Yasuhisa Yamada, Gunma-ken (JP); Akihiro Shoda, Gunma-ken (JP); Atsushi Ozawa, Kanagawa-ken (JP); Masato Taniguchi, Kanagawa-ken (JP)

(73) Assignee: NSK Ltd., Tokyo (JP)

( * ) Notice: Subject to any disclaimer, the term of this patent is extended or adjusted under 35 U.S.C. 154(b) by 589 days.

(21) Appl. No.: 10/489,449

(22) PCT Filed: Oct. 1, 2002

(86) PCT No.: PCT/JP02/10212

§ 371 (c)(1), (2), (4) Date: Mar. 11, 2004

(87) PCT Pub. No.: WO03/031250

PCT Pub. Date: Apr. 17, 2003

(65) Prior Publication Data

US 2004/0245759 A1    Dec. 9, 2004

(30) Foreign Application Priority Data

Oct. 1, 2001   (JP)   ............................... 2001-304925
Aug. 6, 2002   (JP)   ............................... 2002-229022

(51) Int. Cl.
    *B62D 1/18*   (2006.01)
(52) U.S. Cl. ......................................... 74/493; 280/775
(58) Field of Classification Search .................... 74/493, 74/492; 464/167; 280/775
    See application file for complete search history.

(56) References Cited

U.S. PATENT DOCUMENTS

| 2,607,257 | A |   | 8/1952  | Hadden |
| 3,169,407 | A |   | 2/1965  | Newell |
| 3,356,424 | A |   | 12/1967 | Edwards |
| 3,392,599 | A | * | 7/1968  | White ........................ 74/492 |
| 3,444,753 | A |   | 5/1969  | Runkle |
| 3,604,285 | A |   | 9/1971  | Erland et al. |
| 3,879,093 | A | * | 4/1975  | Betrix ........................ 384/43 |
| 4,012,925 | A |   | 3/1977  | Krude |
| 4,280,341 | A |   | 7/1981  | Krude |
| 4,357,137 | A |   | 11/1982 | Brown |
| 4,384,861 | A |   | 5/1983  | Lange et al. |

(Continued)

FOREIGN PATENT DOCUMENTS

AU            234387        12/1959

(Continued)

*Primary Examiner*—Richard W Ridley
*Assistant Examiner*—Justin Krause
(74) *Attorney, Agent, or Firm*—Miles & Stockbridge P.C.

(57) ABSTRACT

A vehicle steering telescopic shaft having a male shaft and a female shaft so fitted to each other as not to be rotatable but to be slidable. First torque transmitting members are disposed between the male shaft and the female shaft, and roll when the male shaft and the female shaft make relative movements in axial directions. Elastic members are disposed adjacent in a radial direction to the first torque transmitting members and restrict them when rotated and apply a pre-load to the male shaft and the female shaft through the first torque transmitting members when not rotated. Second torque transmitting members are provided between the male shaft and the female shaft, and slide when the male shaft and the female shaft make the relative movements in the axial directions, and transmit a torque when rotated.

18 Claims, 36 Drawing Sheets

U.S. PATENT DOCUMENTS

| | | |
|---|---|---|
| 4,500,141 A | 2/1985 | Daugherty |
| 4,509,386 A | 4/1985 | Kimberlin |
| 4,667,530 A | 5/1987 | Mettler et al. |
| 4,705,491 A | 11/1987 | Andersson |
| 5,184,978 A | 2/1993 | Fillmore et al. |
| 5,226,853 A | 7/1993 | Courgeon |
| 5,235,734 A | 8/1993 | DuRocher |
| 5,460,574 A | 10/1995 | Hobaugh |
| 5,542,343 A | 8/1996 | Martin |
| 5,709,605 A | 1/1998 | Riefe et al. |
| 5,899,811 A | 5/1999 | Kishibuchi et al. |
| 6,035,740 A | 3/2000 | Budaker et al. |
| 6,174,239 B1 | 1/2001 | Guimbretiere |
| 6,279,953 B1 | 8/2001 | Cartwright |
| 6,293,872 B1 | 9/2001 | Ganser |
| 6,343,993 B1 * | 2/2002 | Duval et al. ................. 464/167 |
| 6,364,778 B1 | 4/2002 | Beitzel et al. |
| 6,474,868 B2 | 11/2002 | Geyer et al. |
| 6,510,756 B2 | 1/2003 | Aota |
| 6,533,459 B2 | 3/2003 | Podhajecki et al. |
| 6,557,433 B1 | 5/2003 | Castellon |
| 6,620,050 B2 * | 9/2003 | Park ........................... 464/162 |
| 6,729,648 B2 | 5/2004 | Ulintz |
| 6,733,039 B2 | 5/2004 | Honda et al. |
| 6,755,746 B2 | 6/2004 | Barnley et al. |
| 6,761,503 B2 | 7/2004 | Breese |
| 6,893,353 B2 | 5/2005 | Dutkiewicz et al. |
| 6,902,487 B2 | 6/2005 | Welschof |
| 6,921,338 B2 | 7/2005 | Cermak et al. |
| 6,948,401 B2 | 9/2005 | Zernickel et al. |
| 7,147,375 B2 | 12/2006 | Zernickel et al. |
| 7,226,360 B2 | 6/2007 | Lyon et al. |
| 2001/0006564 A1 | 7/2001 | Geyer et al. ................... 384/49 |
| 2002/0177485 A1 | 11/2002 | Cermack et al. |
| 2003/0073503 A1 | 4/2003 | Perrow |
| 2004/0245759 A1 | 12/2004 | Yamada et al. |
| 2005/0022623 A1 | 2/2005 | Reiche et al. |
| 2005/0070365 A1 | 3/2005 | Riefe et al. |
| 2005/0104354 A1 | 5/2005 | Yamada et al. |
| 2005/0257639 A1 | 11/2005 | Yamada |
| 2006/0012161 A1 | 1/2006 | Yamada |
| 2006/0039747 A1 | 2/2006 | Shoda et al. |
| 2006/0053934 A1 | 3/2006 | Behr et al. |
| 2006/0060022 A1 | 3/2006 | Yamada |
| 2006/0068924 A1 | 3/2006 | Yamada |
| 2006/0082120 A1 | 4/2006 | Taniguchi et al. |
| 2006/0156855 A1 | 7/2006 | Yukawa et al. |
| 2006/0162989 A1 | 7/2006 | Yamada |
| 2006/0181069 A1 | 8/2006 | Yamada |
| 2006/0252559 A1 | 11/2006 | Yamada |
| 2007/0157754 A1 | 7/2007 | Yamada |
| 2007/0273137 A1 | 11/2007 | Yamada et al. |

FOREIGN PATENT DOCUMENTS

| | | |
|---|---|---|
| DE | 37 30 393 A1 | 3/1989 |
| DE | 19538303 | 4/1997 |
| DE | 19820291 | 11/1999 |
| DE | 19824477 | 12/1999 |
| DE | 19905350 | 8/2000 |
| DE | 10202899 | 8/2002 |
| DE | 20212294 | 10/2003 |
| EP | 0281723 | 9/1988 |
| EP | 1065397 | 1/2001 |
| EP | 1 078 843 A1 | 2/2001 |
| EP | 1 106 851 A1 | 6/2001 |
| EP | 1106851 | 6/2001 |
| EP | 2161127 | 11/2001 |
| EP | 1167790 | 1/2002 |
| EP | 1247719 | 10/2002 |
| EP | 1512607 | 3/2005 |
| EP | 1547903 | 6/2005 |
| EP | 1557338 | 7/2005 |
| EP | 1568569 | 8/2005 |
| EP | 1588921 | 10/2005 |
| FR | 2795787 | 1/2001 |
| GB | 2344084 | 5/2000 |
| GB | 2362688 | 11/2001 |
| GB | 2373551 | 9/2002 |
| JP | 29-16708 | 12/1954 |
| JP | 45-19207 | 8/1970 |
| JP | 62-244758 | 10/1987 |
| JP | UM-1-145670 | 10/1989 |
| JP | UM-4-43522 | 4/1992 |
| JP | 4-123775 | 11/1992 |
| JP | 2000-38142 | 2/2000 |
| JP | 2000-159042 | 6/2000 |
| JP | 2000-205288 | 7/2000 |
| JP | 2000-337395 | 12/2000 |
| JP | 2001-50293 | 2/2001 |
| JP | 2001-193738 | 7/2001 |
| JP | 2001-239944 | 9/2001 |
| JP | 2002-46633 | 2/2002 |
| JP | 2002-286034 | 10/2002 |
| JP | 2002-539033 | 11/2002 |
| SU | 398786 | 9/1973 |
| WO | WO 86/07120 | 12/1986 |
| WO | WO 99/08920 | 2/1999 |
| WO | WO 00/55028 | 9/2000 |
| WO | WO 2004/033270 | 4/2004 |

* cited by examiner

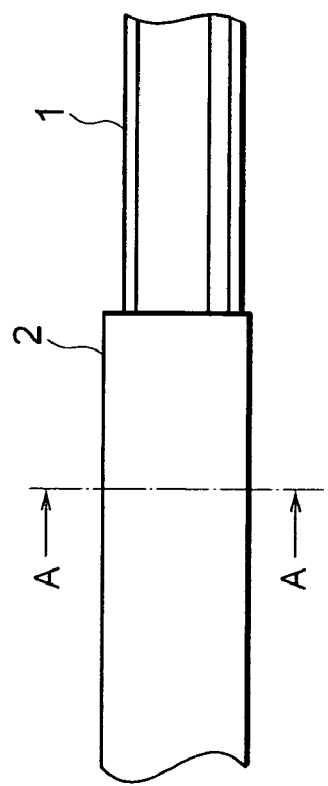
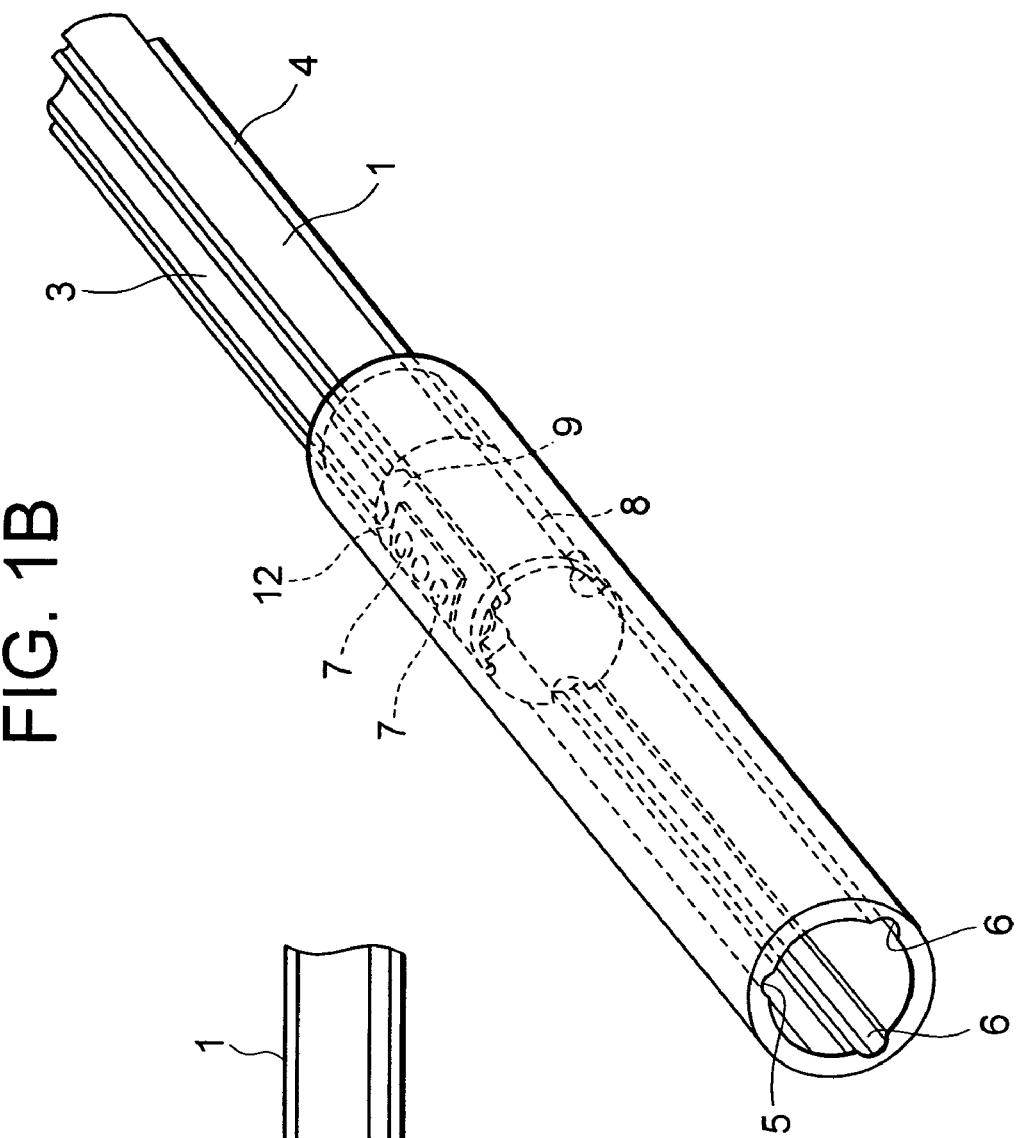

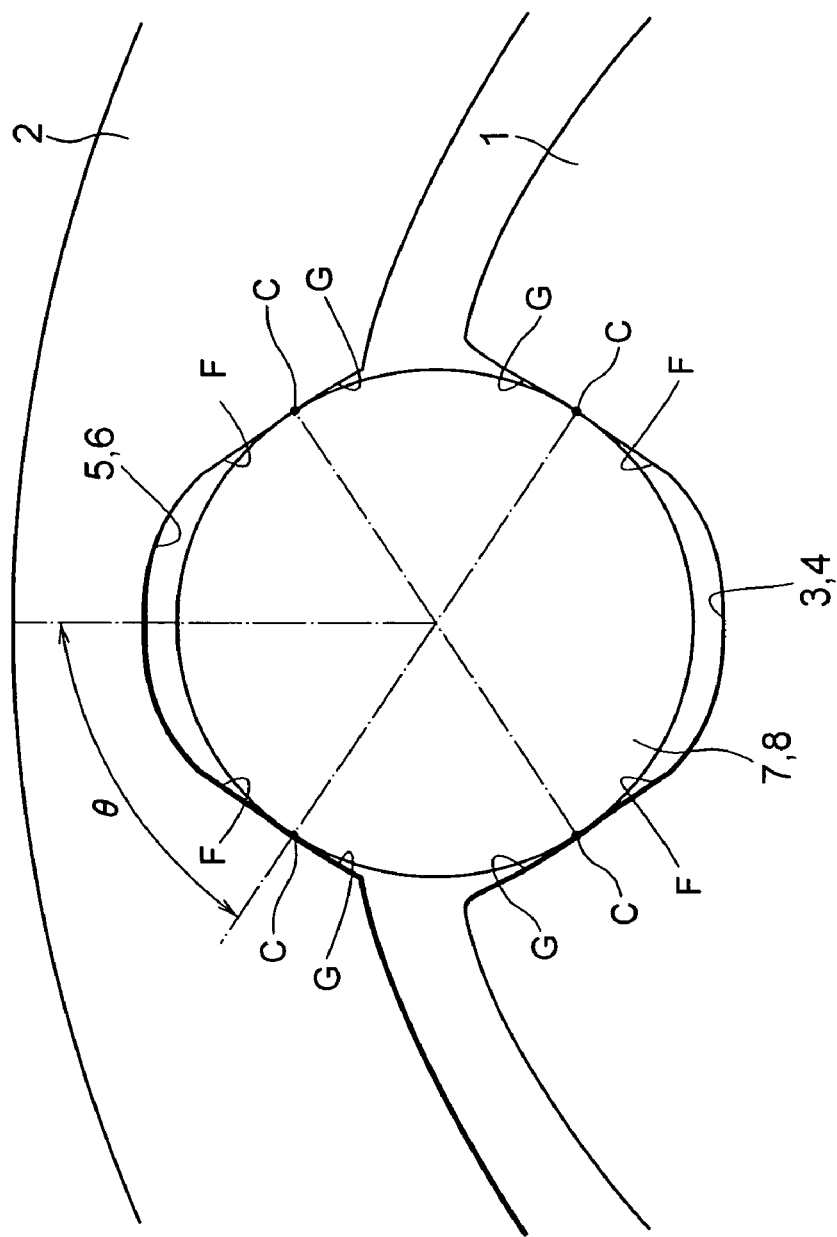

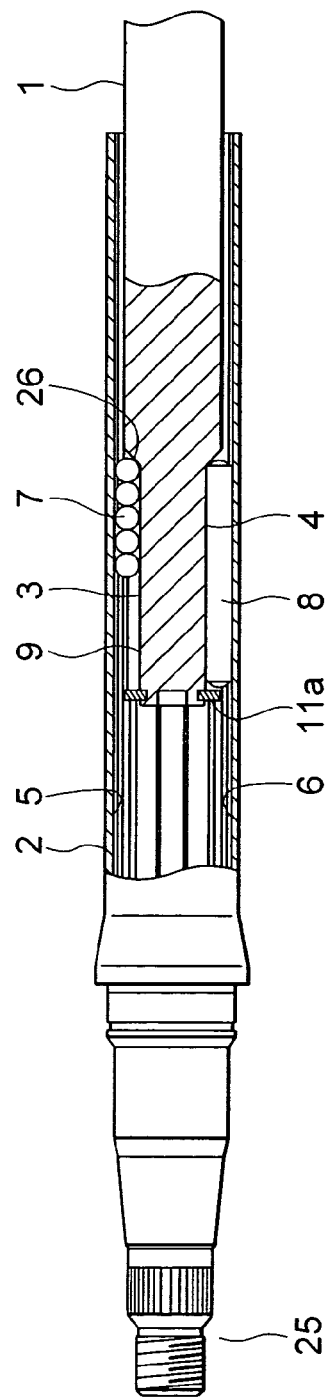
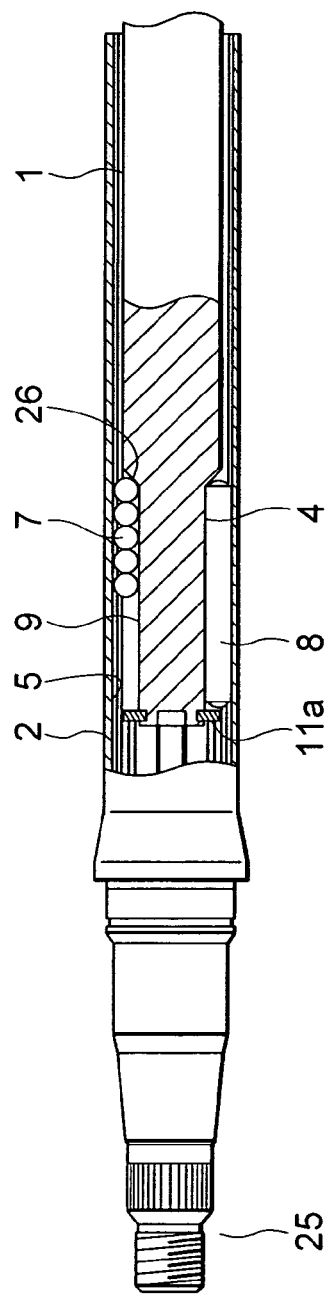
FIG.21A
FIG.21B

VEHICLE STEERING TELESCOPIC SHAFT

TECHNICAL FIELD

The present invention relates to a telescopic shaft for a vehicle steering.

BACKGROUND ARTS

A steering mechanism unit of an automobile has hitherto involved the use of, as a part of the steering mechanism unit, a telescopic shaft absorbing an axial displacement occurred when the automobile travels and including a male shaft and a female shaft that are spline-fitted to each other in order not to transfer the displacement and vibrations onto a steering wheel. What is required of the telescopic shaft is to reduce backlash noises at the spline portion, to reduce a feeling of backlash on the steering wheel and to reduce a slide resistance when sliding in axial directions.

For these requirements, the spline portion of the male shaft of the telescopic shaft is coated with a nylon layer, and further a grease is applied over a sliding portion, thereby absorbing or relieving metal noises, metal butting sounds, etc. and also reducing the slide resistance and the backlash in a rotating direction. In this case, a processing flow of forming the nylon layer is: cleaning the shaft→coating a primer→heating→coating nylon powder→rough cutting→finish-cutting→selective fitting to the female shaft. A final cutting work is conducted in a way that selects dies adjusted to an accuracy of the already-worked female shaft.

It is required that even the backlash be restrained to the minimum while restraining a slide load on the telescopic shaft to the minimum, and hence the final cutting work has no option but to select the dies matched with the female shaft which differ by every several microns in size of an over-pin diameter and to perform working, with the result that a rise in working cost is brought about. Moreover, the backlash in the rotating direction increases as an abrasion of the nylon layer progresses with transitions of the use.

Further, under such a condition as to be exposed to a high temperature in an engine room, the nylon layer changes in volume as followed by a remarkable rise in slide resistance and a remarkably-accelerated progression of the abrasion, and therefore the backlash in the rotating direction increases.

Accordingly, there is a demand for providing the telescopic shaft employed for the steering shaft for the automobile with a simple and low-cost structure capable of restraining over a long period of time an emission of heterogeneous sounds due to the backlash in the rotating direction and deterioration in the feeling of steering.

DISCLOSURE OF THE INVENTION

It is an object of the present invention, which was devised under such circumstances described above, to provide a telescopic shaft for a vehicle steering that is capable of actualizing a stable slide load, surely preventing a backlash in a rotating direction and transferring a torque in a high-rigidity state.

To accomplish the above object, the present invention provides a telescopic shaft for a vehicle steering, assembled into a steering shaft of a vehicle and having a male shaft and a female shaft that are so fitted to each other as not to be rotatable but to be slidable, being characterized by comprising: a first torque transmitting device constructed of a first interposing portion provided in an outer peripheral surface of the male shaft and in an inner peripheral surface of the female shaft, first torque transmitting members disposed in the first interposing portion and rolling when the male shaft and the female shaft make relative movements in axial directions, and elastic members disposed respectively adjacent in a radial direction to the first torque transmitting members in the first interposing portion, restricting the first torque transmitting members when rotated and applying a pre-load to the male shaft and the female shaft through the first torque transmitting members when not rotated; and a second torque transmitting device constructed of a second interposing portion provided in the outer peripheral surface of the male shaft and in the inner peripheral surface of the female shaft, and second torque transmitting members disposed in the second interposing portion, sliding when the male shaft and the female shaft make the relative movements in the axial directions, and transmitting a torque when rotated.

Further, in the telescopic shaft for the vehicle steering according to the present invention, it is preferable that the first interposing portion and the second interposing portion be structured of first axial grooves and second axial grooves that are formed in pairs respectively in an outer peripheral surface of the male shaft and an inner peripheral surface of the female shaft.

Still further, in the telescopic shaft for the vehicle steering according to the present invention, it is preferably that the first torque transmitting device and the second torque transmitting device be disposed in positions different in a peripheral direction between the male shaft and the female shaft.

Yet further, in the telescopic shaft for the vehicle steering according to the present invention, it is preferable that the first interposing portion of the first torque transmitting device be structured of the first axial groove and the second axial groove that are formed in the male shaft and in the female shaft, and the first torque transmitting members consist of a plurality of spherical members disposed in the first axial groove and in the second axial groove, the second interposing portion of the second torque transmitting device be structured of two sets of third axial grooves and fourth axial grooves that are disposed apart from each other in a circumferential direction, and the second torque transfer members consist of cylindrical members disposed in the third and fourth axial grooves, of which axial directions are set parallel with the male shaft and with the female shaft.

Moreover, in the telescopic shaft for the vehicle steering according to the present invention, the first interposing portion be structured of plural pairs of axial grooves formed between the male shaft and the female shaft, and the second interposing portion be structured of plural pairs of axial grooves disposed between the adjacent pairs of axial grooves of the first interposing portion.

As described above, the telescopic shaft for the vehicle steering includes: the first torque transmitting device constructed of the first interposing portion provided in the outer peripheral surface of the male shaft and in the inner peripheral surface of the female shaft, the first torque transmitting members disposed in the first interposing portion and rolling when the male shaft and the female shaft make the relative movements in the axial directions, and the elastic members disposed adjacent in the radial direction to the respective first torque transmitting member in the first interposing portion, restricting the first torque transmitting members when rotated and applying the pre-load to the male shaft and the female shaft through the first torque transmitting members when not rotated; and the second torque transfer device constructed of the second interposing portion provided in the outer peripheral surface of the male shaft and in the inner peripheral surface of the female shaft, and the second torque transmitting members disposed in the second interposing portion, sliding when the male shaft and the female shaft make the relative movements in the axial directions, and transmitting a torque when rotated. Then, the first interposing portion and the second interposing portion are structured of the first axial grooves and the second axial grooves that are formed in pairs respectively in the outer peripheral surface of the male shaft and the inner peripheral surface of the female shaft.

When the torque is not transmitted, the telescopic shaft for the vehicle steering according to the present application is, with the first torque transmitting device and the second torque transmitting device employed, the elastic members applying the pre-load to the first torque transmitting members and to the second torque transmitting members against the female shaft to such an extent as to not cause a backlash, capable of surely preventing the backlash between the male shaft and the female shaft and making the male shaft and the female shaft slide in the axial directions with the stable slide load without any backlash.

On the other hand, when the torque is transmitted, the telescopic shaft for the vehicle steering according to the present application is, the elastic member being able to restrict the first transmitting members and the second torque transmitting members in the peripheral direction, capable of surely preventing the backlash in the rotating direction between the male shaft and the female shaft and transferring the torque in the high-rigidity state.

Further, in the telescopic shaft for the vehicle steering according to the present invention, it is preferable that the first torque transmitting members consist of cylindrical members disposed so that an axial direction thereof is set in a direction intersecting the male shaft and the female shaft.

Moreover, in the telescopic shaft for the vehicle steering according to the present invention, it is preferable that the elastic members be composed of plate springs.

Furthermore, in the telescopic shaft for the vehicle steering according to the present invention, it is preferable that the axial groove includes a shallow portion and a deep portion, the shallow portion of the groove be formed in a curved-surface shape, while the deep portion of the groove be formed in a flat shape, the first torque transmitting member and the second torque transmitting member abut on each other in the vicinity of a boundary point between the curved-surface portion and the flat portion.

Further, in the telescopic shaft for the vehicle steering according to the present invention, it is preferable that the male shaft be provided with a groove end portion for generating a large slide by restricting the first torque transmitting members form rolling in the axial directions when a collision happens, and for supplementally absorbing an impact energy when the collision happens.

Still further, in the telescopic shaft for the vehicle steering according to the present invention, it is preferable that a gap between the male shaft, the second torque transmitting member and the female shaft be arbitrarily set by properly selecting a diameter of the second torque transmitting member or combining diameters thereof.

Yet further, in the telescopic shaft for the vehicle steering according to the present invention it is preferable that the elastic members are in contact with the respective first torque transmitting members at a certain fixed contact angle, generate pre-load in the radial direction and in the peripheral direction when a torque is not inputted to the male shaft or the female shaft, and generate the pre-load in the peripheral direction when the torque is inputted to the male shaft or the female shaft.

Moreover, in the telescopic shaft for the vehicle steering according to the present invention, it is preferable that the first torque transmitting devices be disposed in the three pairs of axial grooves arranged equally at an interval of 120 degrees in the peripheral direction, and the second torque transmitting devices be disposed between the three pairs of axial grooves.

Furthermore, in the telescopic shaft for the vehicle steering according to the present invention, it is preferable that the second torque transmitting devices be disposed respectively in central portions in the peripheral direction between the three pairs of axial grooves.

Still furthermore, in the telescopic shaft for the vehicle steering according to the present invention, it is preferable that a first torque transmitting member holder for holding the first torque transmitting members in a rollable manner be disposed in a telescopic shaft for a vehicle steering in which the fist torque transmitting device and the second torque transmitting device are disposed between the male shaft and the female shaft.

Yet furthermore, in the telescopic shaft for the vehicle steering according to the present invention, it is preferable that the holder has elongate holes or a plurality of round holes arranged extending in the axial directions of the male shaft and of the female shaft, and the first torque transmitting members be disposed in the elongate holes or in the plurality of round holes.

Further, in the telescopic shaft for the vehicle steering according to the present invention, it is preferable that the holder takes a cylindrical shape and has elongate holes or a plurality of round holes arranged extending in the axial directions of the male shaft and of the female shaft, and the first torque transfer members be disposed in the elongate holes or in the plurality of round holes.

Moreover, in the telescopic shaft for the vehicle steering according to the present invention, it is preferable that the holder taking the cylindrical shape has interference avoiding elongate holes for avoiding interference with the second torque transmitting device or an interference avoiding open slit opened at its side end portion.

Further, in the telescopic shaft for the vehicle steering according to the present invention, it is preferable that a total length of the interference avoiding elongate holes or the open slits for avoiding the interference with the second torque transmitting device, be longer than a total length of the elongate holes or a train of the plurality of round holes for holding the first toque transmitting members.

BRIEF DESCRIPTION OF THE DRAWINGS

FIG. 1A is a side view of a telescopic shift for a vehicle steering in a first embodiment of the present invention;

FIG. 1B is a perspective view thereof;

FIG. 19 is a cross sectional view of a principal portion of the telescopic shaft for the vehicle steering in a sixth embodiment of the present invention;

FIGS. 21A and 21B are vertical sectional views of the telescopic shaft for the vehicle steering illustrated in FIG. 19, showing the collapsible state when the secondary collision of the vehicle happens;

EMBODIMENTS OF THE INVENTION

A telescopic shaft for a vehicle steering in an embodiment of the present invention will be described with reference to the drawings.

Figure 36:
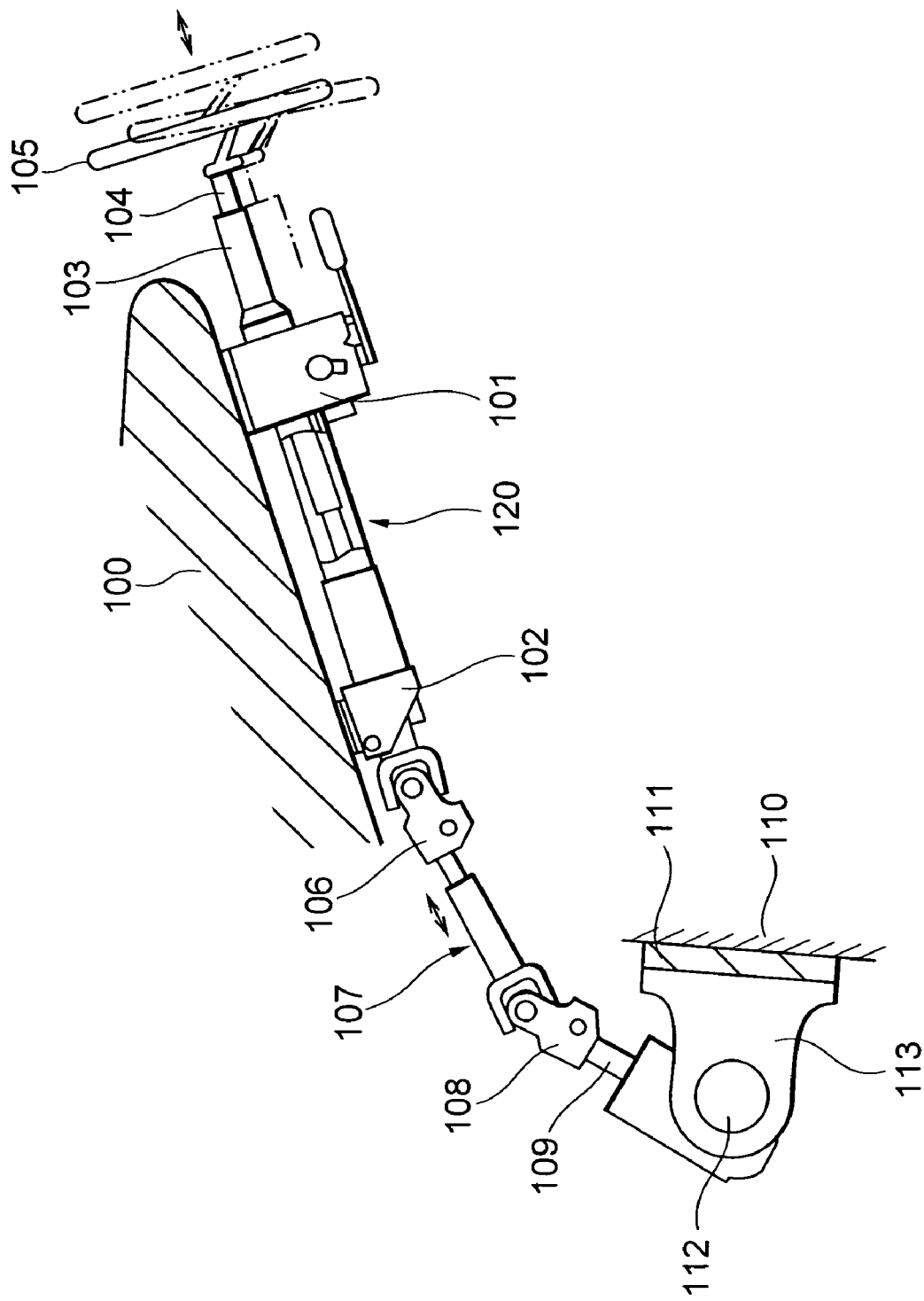
FIG. 36 is a side view of a steering mechanism unit of an automobile, to which the telescopic shaft for the vehicle steering in the embodiment of the present invention is applied.

FIG. 36 is a side view of a steering mechanism unit of an automobile, to which the telescopic shaft for the vehicle steering in the embodiment of the present invention is applied.

Referring to FIG. 36, the steering mechanism unit is constructed of an upper steering shaft member 120 (including a steering column 103 and a steering shaft 104 rotatably held in the steering column 103) attached to a car-body-sided member 100 through an upper bracket 101 and a lower bracket 102, a steering wheel 105 secured to an upper end of the steering shaft 104, a lower steering shaft member 107 connected via a universal joint 106 to a lower end of the steering shaft 104, a pinion shaft 109 connected via a steering shaft joint 108 to the lower steering shaft member 107, a steering rack shaft 112 connected to the pinion shaft 109, and a steering rack support member 113 that supports this steering rack shaft 112 and is fixed through an elastic member 111 to a different frame 110 on the car body.

Herein, the upper steering shaft member 120 and the lower steering shaft member 107 utilize the telescopic shaft for the vehicle steering (which will hereinafter be simply called the telescopic shaft) in accordance with the embodiment of the present invention. The lower steering shaft member 107 is constructed by fitting a male shaft into a female shaft. What is required of this type of lower steering shaft member 107 is, however, a performance of absorbing an axial displacement occurred when the automobile travels and preventing this displacement and vibrations from being transmitted onto the steering wheel 105. Such a performance is required in the case of a structure where the car body is of a sub-frame structure, the member 100 for fixing the upper portion of the steering mechanism is separate from the frame 110 to which the steering rack support member 113 is fixed, and the steering rack support member 113 is fastened and fixed to the frame 110 through the elastic member 111 such as a rubber. Further, there is other case in which a retractable function is needed because of a worker's fitting and fastening the telescopic shaft, after temporarily shrinking it, to the pinion shaft 109 on the occasion of fastening the steering shaft joint 108 to the pinion shaft 109. Moreover, the upper steering shaft member 120 provided in a comparatively upper position of the steering mechanism is also constructed by fitting a male shaft into a female shaft. This type of upper steering shaft member 120 is, however, required to have a function of adjusting a position of the steering wheel 105 by moving this position in the axial direction in order for a driver to obtain a position optimal to drive the automobile, and is therefore required to have an axially retractable function. In all the cases described above, what is required of the telescopic shaft is to reduce the backlash noises at the fitting portion, to reduce the feeling of backlash on the steering wheel 105 and to reduce the slide resistance when sliding in the axial direction.

First Embodiment

Figure 2:
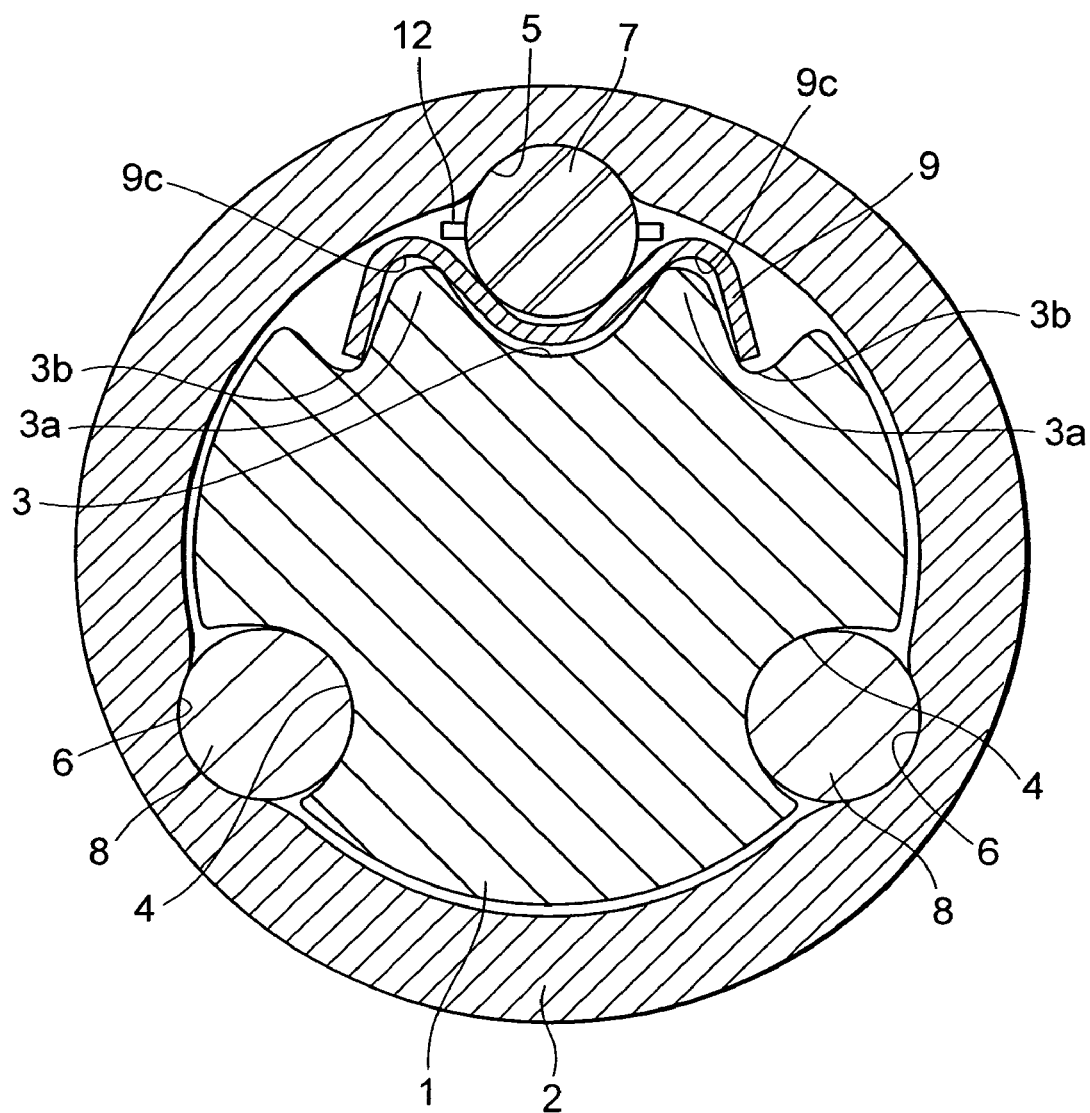
FIG. 2 is a cross sectional view taken along the line A-A in FIG. 1A.
Figure 3:
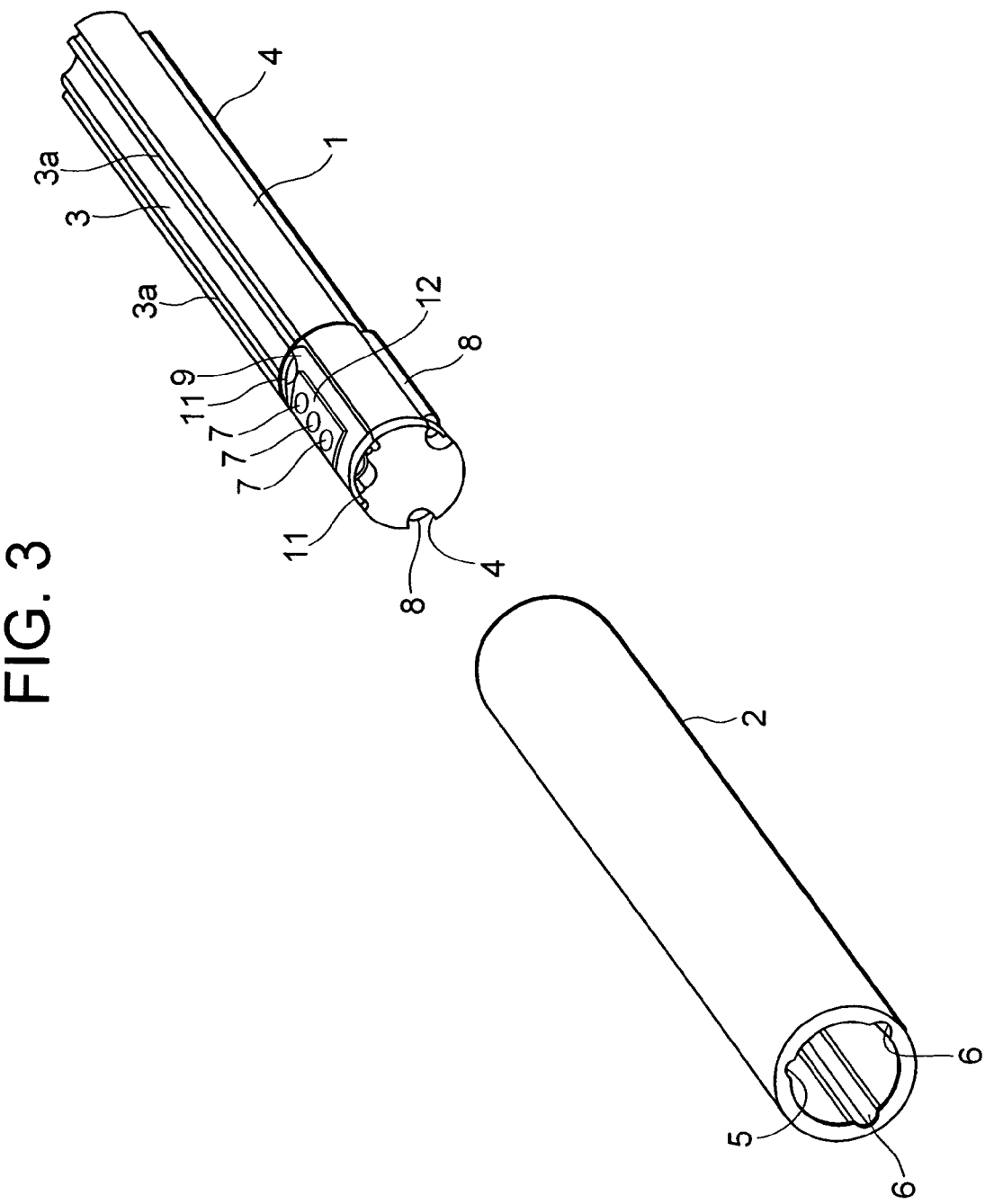
FIG. 3 is a perspective view of a state where a male shaft and a female shaft of the telescopic shaft shown in FIG. 1 are separated.

FIG. 1A is a side view of the telescopic shaft for the vehicle steering in a first embodiment of the present invention. FIG. 1B is a perspective view thereof. FIG. 2 is a cross sectional view taken along the line A-A in FIG. 1A. FIG. 3 is a perspective view showing a state where a male shaft and a female shaft of a telescopic shaft shown in FIG. 1 are separated. FIGS. 4A and 4B are plan views each showing an example of a plate spring. FIG. 4C is an exploded perspective view of the telescopic shaft for the vehicle steering. FIG. 5 is a graph showing a relationship between a stroke of and a slide load of the telescopic shaft for the vehicle steering in the first embodiment.

As shown in FIG. 1, the telescopic shaft for the vehicle steering (which will hereinafter be simply called the telescopic shaft) is constructed of a male shaft 1 and a female shaft 2 that are so fitted as not to be rotatable but to be slidable on each other.

As shown in FIG. 2, three lines of axial grooves 3, 4, 4 taking substantially a circular-arced shape and disposed at an interval of 120 degrees in a peripheral direction, are formed extending on an outer peripheral surface of the male shaft 1. Corresponding thereto, three lines of axial grooves 5, 6, 6 taking substantially the circular-arced shape disposed at the interval of 120 degrees in the peripheral direction, are formed extending on an inner peripheral surface of the female shaft 2. The axial grooves 3, 5 form a first interposing portion, and the axial grooves 4, 6; 4, 6 form a second interposing portion.

A plate spring 9, which will be explained later on, is provided as a pre-loading elastic member formed in substantially an M-shape between the axial groove 3, taking substantially the circular-arced shape in section, of the male shaft 1 and the axial groove 5, taking substantially the circular-arced shape, of the female shaft 2; and a plurality of rigid spherical members 7 as first torque transmitting members are so interposed as to be rollable between a central concave portion of the plate spring 9 and the axial groove 5, thereby structuring a first torque transmitting device. Thus, the spherical members 7 roll when the male shaft 1 and the female shaft 2 make their relatives movements in the axial direction and are, when rotating, restrained by the plate spring 9 to transmit a torque.

Cylindrical members 8 serving as second torque transmitting members that permit the male shaft 1 and the female shaft 2 to make their relative movements in the axial direction and transmit the torque when rotating, are slidably interposed between two lines of axial grooves 4, 4, each taking substantially the circular-arced shape or a Gothic arched shape, of the male shaft 1 and two lines of axial grooves 6, 6, each taking substantially the circular-arced shape or the gothic arched shape, of the female shaft 2, thereby structuring a second torque transmitting device.

Grooves 3b, 3b are formed extending in parallel with the groove 3 in the axial direction on both sides of the axial groove 3 of the male shaft 1, and stepped portions 3a, 3a are formed between the axial groove 3 and the grooves 3b, 3b. Both side ends of the plate spring 9 taking substantially the M-shape in section extend respectively down to bottoms of the grooves 3b, 3b, and the most end portions are in contact with on the stepped portions 3a, 3a so as to pinch these stepped portions 3a, 3a, respectively. Thus, the plate spring 9 is latched at concave portions 9c, 9c thereof by the stepped portions 3a, 3a provided on both sides of the axial groove 3 of the male shaft 1, whereby the whole of the plate spring 9 is unable to move in the peripheral direction when transmitting the torque.

The plate spring 9, when the torque is not transmitted, applies a pre-load onto each of the spherical members 7 and the cylindrical members 8, 8 to such an extent as not to cause any backlash with respect to the female shaft 2, and, when transmitting the torque, elastically deforms to operate for restraining the spherical members 7 in the peripheral direction between the male shaft 1 and the female shaft 2.

Note that two lines of peripheral grooves 10 are, as shown in FIG. 4C, formed in positions of the male shaft 1 in which the two pieces of cylindrical members 8 and the two side ends of the plate spring 9 are disposed. Further, as shown in FIG. 4A, protrusions 9a are formed at both ends of the plate spring 9 in the axial direction. As shown in FIG. 3, two pieces of stop rings 11 are fitted into the two peripheral grooves 10, thereby fixing the two pieces of cylindrical members 8 in the axial direction and also having the protrusions 9a of the plate spring 9 firmly engaged with inner peripheries of the stop rings 11. The protrusions formed at the both ends of the plate spring 9 in the axial direction, each may take a configuration as indicated by a symbol 9b in FIG. 4B.

The plurality of spherical members 7 are held by a holder 12, and the spherical members 7 and the holder 12 are regulated in their axial movements by the stop rings 11 when sliding.

In the thus structured telescopic shaft, the spherical members 7 and the cylindrical members 8 are interposed between the male shaft 1 and the female shaft 2, and the plate spring 9 applies the pre-load onto the spherical members and the cylindrical members 8 to such an extent as not to cause the backlash with respect to the female shaft 2, thereby making it possible to surely prevent the backlash between the male shaft 1 and the female shaft 2 and enabling the male shaft 1 and the female shaft 2 to slide with a stable slide load without the backlash when making the relative movements in the axial direction.

Note that if the slide surface would be a purely slidable surface as by the prior arts, there could be nothing but to restrict the pre-loading for preventing the backlash to a certain level of load. This is because the slide load is what a friction coefficient is multiplied by the pre-load, and, if the pre-load is increased in the hope of preventing the backlash and improving the rigidity of the telescopic shaft, it followed that the situation falls into such a vicious circle that the slide load rises.

In this respect, the first embodiment adopts partially the rolling mechanism, and hence the pre-load could be increased without bringing about a remarkable increase in the slide load. This enabled attainments of preventing the backlash and improving the rigidity, which could not be accomplished by the prior arts.

According to the first embodiment, when transmitting the torque, the plate spring 9 elastically deforms to restrain the spherical members 7 in the peripheral direction between the male shaft 1 and the female shaft 2, and besides the two lines of cylindrical members 8 interposed between the male shaft 1 and the female shaft 2 perform a major role of transmitting the torque.

For example, in a case where the torque is inputted from the male shaft 1, the pre-load of the plate spring 9 being still applied at an initial stage, no backlash is caused, and the plate spring 9 generates reaction against the torque, thereby transmitting the torque. At this moment, the total torque transmitting is conducted in a state where a load of the torque transmitting among the male shaft 1, the plate spring 9, the spherical members 7 and the female shaft 2 is equilibrated with a load of the torque transmitting among the male shaft 1, the cylindrical members 8 and the female shaft 2.

As the torque further increases, the cylindrical member 8 receives stronger reaction than the spherical member 7, since a clearance between the male shaft 1 and the female shaft 2 in the rotation direction through the cylindrical member 8 is set smaller than a clearance between the male shaft 1, the plate spring 9, the spherical member 7 and the female shaft 2 through the spherical member 7, with the result that mainly the cylindrical member 8 transmits the torque to the female shaft 2. It is therefore feasible to surely prevent the backlash in the rotating direction between the male shaft and the female shaft 2 and to transfer the torque in the state of exhibiting the high rigidity.

Note that the spherical members 7, it is preferable, be rigid balls. Further, it is preferable that the rigid cylindrical members 8 be a needle rollers.

There are variety of effects in which the cylindrical member (which will hereinafter be called the needle roller) 8 receives the load through a line-contact and can therefore restrain a contact pressure lower than the ball receiving the load through a point-contact, and so on. Accordingly, the following items are superior to a case where the ball rolling structure is adopted for all the lines.

A damping capacity effect at the slide portion is larger than in the ball rolling structure. Hence, a vibration absorbing performance is high.

If the same torque is transmitted, the needle roller can restrain the contact pressure lower than the ball, whereby a length in the axial direction can be decreased and a space can be effectively utilized.

If the same torque is transmitted, the needle roller can restrain the contact pressure lower than the ball, and hence there is no necessity for an additional process for hardening the surface of the axial groove of the female shaft by a thermal treatment, etc.

The number of parts can be decreased.

An assembling characteristic can be improved.

An assembly cost can be restrained.

Thus, the needle roller 8 performs the key role of transferring the torque between the male shaft 1 and the female shaft 2, and is brought into a slide-contact with the inner peripheral surface of the female shaft 2. The use of the needle roller has the following excellent points as compared with the conventional spline-fitting.

The needle roller is a product of mass-production and is therefore extremely low of cost.

The needle roller is polished after the thermal treatment and is therefore high of surface hardness and excellent of anti-abrasion characteristic.

The needle roller is polished and is therefore fine of surface roughness and low of friction coefficient when sliding, whereby the slide load can be restrained low.

A length and a layout of the needle roller can be changed corresponding to conditions for use, and hence there can be given a flexibility to a variety of applications without changing a design concept.

There might be a case in which the friction coefficient must be decreased depending on the conditions for use, in this case the slide characteristic thereof can be changed simply by effecting a surface treatment on only the needle roller. Hence, there can be given the flexibility to the variety of applications without changing the design concept.

As the needle rollers can be manufactured at a low cost in a way that differentiates their major diameters on a several-micron basis, a clearance between the male shaft, the needle rollers and the female shaft can be restrained to the minimum by selecting the diameters of the needle rollers. Hence, an improvement of the rigidity of the shaft in a torsional direction can be facilitated.

On the other hand, the point that the spherical members (which will hereinafter be called balls) 7 are partially adopted, has the following excellent items as compared with the all-line-needle-roller and all-line-slidable structure.

The ball is low of the frictional resistance, and hence the slide load can be restrained low.

The use of the ball can increase the pre-load, whereby the prevention of the backlash over a long period of time and the high rigidity can be simultaneously acquired.

FIG. 5 is the graph showing the relationship between the stroke of and the slide load of the telescopic shaft for the vehicle steering in the first embodiment. FIG. 5 shows a comparison with a relationship between the stroke of and the slide load of the telescopic shaft for the vehicle steering that utilizes the ball rolling structure. It can be understood from this comparison that the telescopic shaft for the vehicle steering in the first embodiment is capable of restraining fluctuations in the slide load and exhibits a smooth slide characteristic.

Further, according to the first embodiment, as shown in FIG. 5, what can be given as an extremely advantageous point is that the fluctuations in the slide load are small over the entire torque area. Even in any structures disclosed in, for example, German Patent Application Laid-Open Publication DE3730393A1, a high pre-load must be given when trying to eliminate the backlash in the peripheral direction and obtain a high rigidity in the peripheral direction, with the result that the slide load fluctuates at a ball rolling cycle. There is a disadvantageous point in which this produces an unpreferable feeling of steering as the shaft for the steering. Unlike the above-mentioned, according to the first embodiment, the needle rollers 8 exhibiting the extremely good slide characteristic are employed compositely with the balls 7, thereby making it possible to restrain the torque fluctuations due to the rolling of the balls 7 while restraining the rise in the slide load.

Further, when scheming to ensure the high rigidity in the radial direction (the direction perpendicular to the axis) with the construction disclosed in German Patent Application Laid-Open Publication DE3730393A1, a length to which the balls are interposed must be taken long, and this is limited in space and disadvantageous. Besides, there is such a disadvantageous point that in the case of the construction disclosed in this Publication, the male shaft is easy to fall down in the radiation direction about the balls interposed, and this characteristic causes the unpreferable feeling of steering as the shaft for the steering. According to the first embodiment, the needle rollers 8 are interposed extending over the entire area of the range where the balls 7 make reciprocating motions, and hence the rigidity in the radial direction can be ensured at a high level.

Second Embodiment

Figure 6:
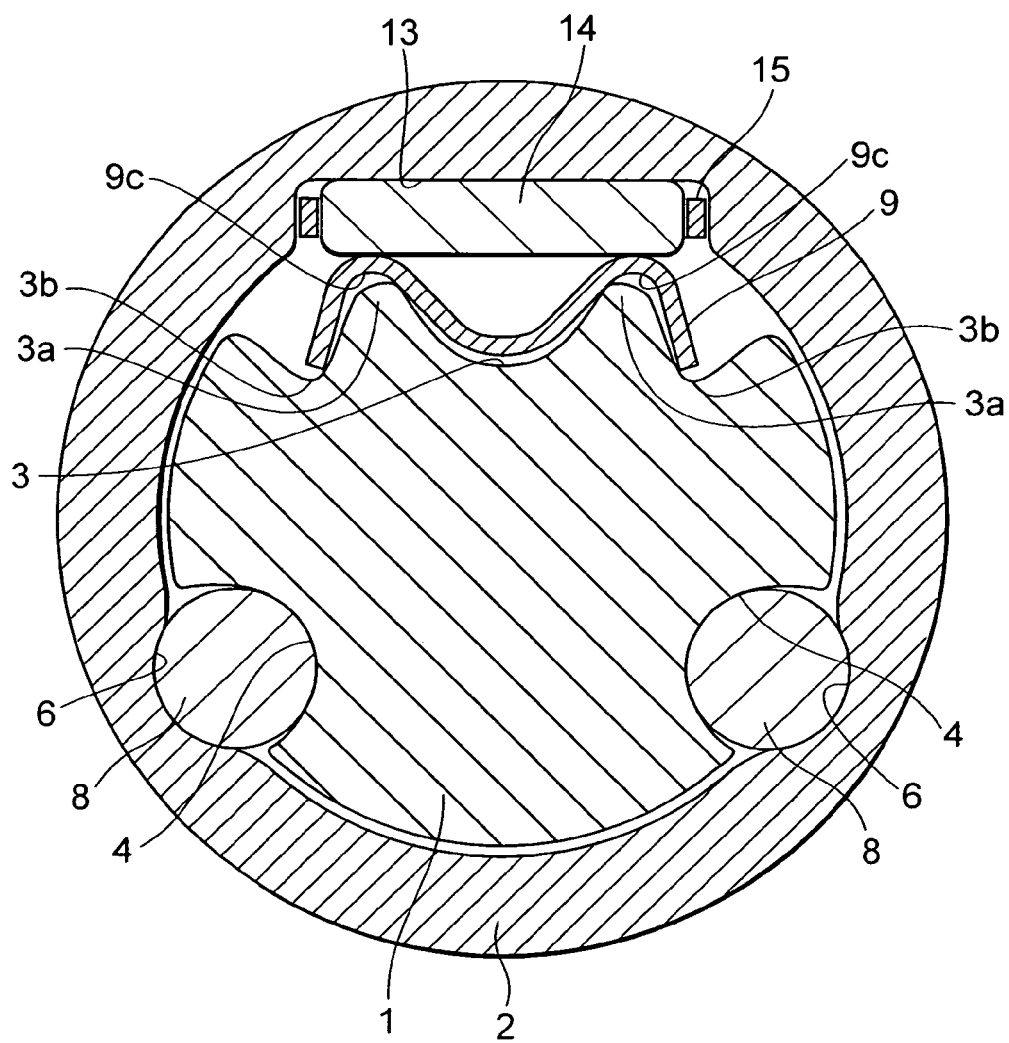
FIG. 6 is a cross sectional view of the telescopic shaft for the vehicle steering in a second embodiment of the present invention.

FIG. 6 is a cross sectional view of the telescopic shaft for the vehicle steering in a second embodiment of the present invention.

A different point of the second embodiment from the first embodiment is that the first torque transmitting member involves the use of the rigid spherical members 7 in the first embodiment, and by contrast, according to the second embodiment, cylindrical members 14 as the first torque transmitting member are so interposed as to be rollable.

In the second embodiment, the female shaft 2 is provided with an axial groove 13 of which a bottom surface is formed flat, a plurality of cylindrical members 14 of which axial direction is set orthogonal to the direction in which the male shaft 1 and the female shaft 2 extend, and a holder 15 holds these cylindrical members 14. Other configurations, etc. are the same as those in the first embodiment discussed above.

The second embodiment also acquires the same features as those in the first embodiment and is effective in, as a matter of course, preventing the backlash and in the case of aiming at further improving the torsional rigidity and the durability. The spherical member 7 receives the load through the point-contact, and by contrast the cylindrical member 14 receives the load through the line-contact (precisely, since neither the spherical member nor the cylindrical member is a perfect rigid member, the spherical member comes to have a circular or elliptic contact surface, and the cylindrical member comes to have an elliptic or elongated contact surface). Namely, the cylindrical member 14 can receive a higher load than by the spherical member 7 in the first embodiment. Hence, an effect is that the pre-load applied onto the cylindrical member 14 can be increased, and essentially the torsion-directional rigidity of the whole telescopic shaft can be more improved than in the first embodiment. It is preferable that the cylindrical member 14 be the needle roller.

Third Embodiment

Figure 7:
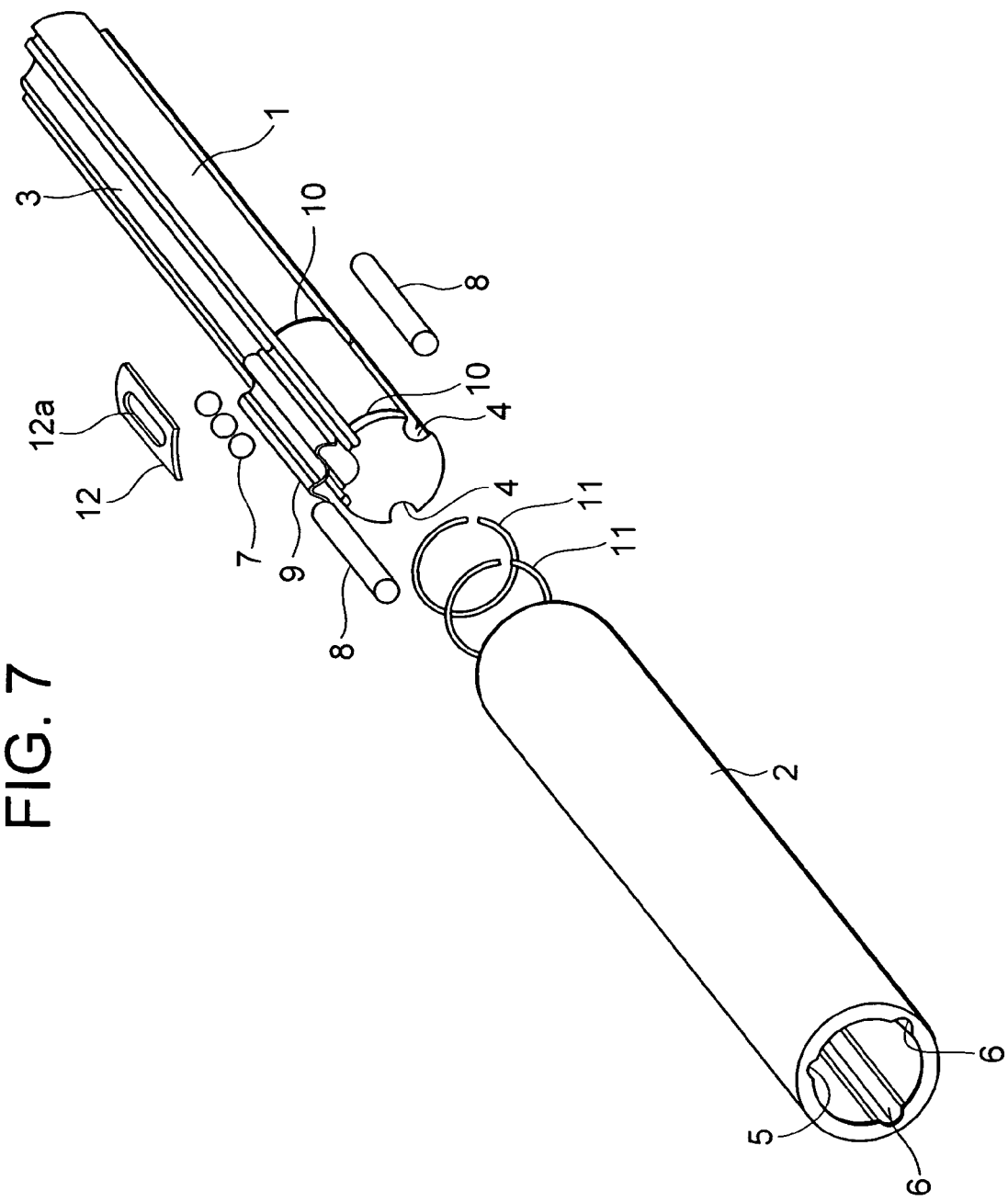
FIG. 7 is an exploded perspective view of the telescopic shaft for the vehicle steering in a third embodiment of the present invention.
Figure 8:
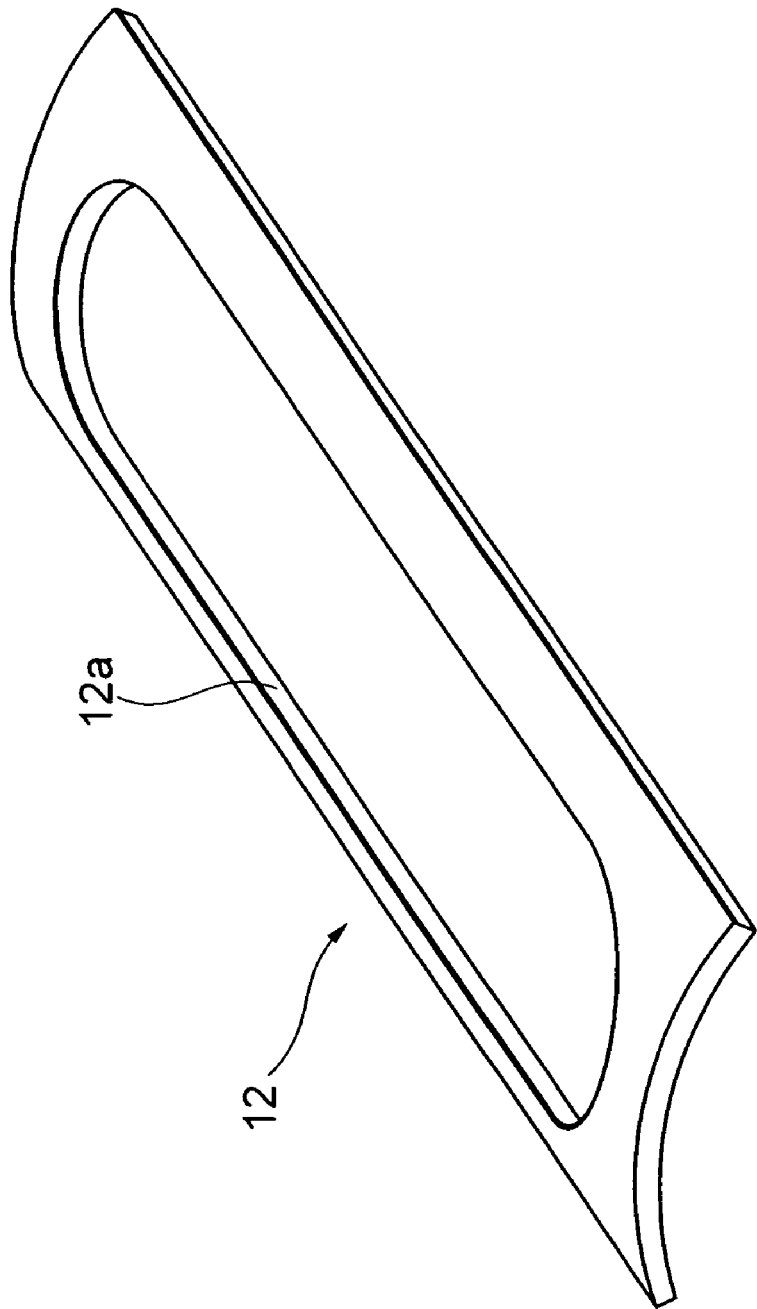
FIG. 8 is a perspective view of a holder shown in FIG. 7.

FIG. 7 is an exploded perspective view of the telescopic shaft for the vehicle steering in a third embodiment of the present invention. FIG. 8 is a perspective view of the holder shown in FIG. 7.

In the first embodiment (FIGS. 3 and 4) described above, the holder 12 disposed between the male shaft 1 and the female shaft 2 has a plurality of through-holes extending in the axial direction, and holds, e.g., the spherical members 7 as the first torque transmitting members. When the male shaft 1 and the female shaft 2 make the relative movements, the holder 12 also moves corresponding thereto.

The plurality of spherical members 7 are, however, received respectively in the plurality of through-holes, and hence there might be a possibility in which a speed difference occurs, and the slide resistance is not stabilized.

Such being the case, according to the third embodiment, for the purpose of stabilizing the slide resistance, as shown in FIGS. 7 and 8, the holder 12 is formed with one elongate hole 12a for receiving the plurality of spherical members on the whole. This is because if the holder 12 is provided with a pillar or partition in a limited space, the number of the spherical members 7 to be used decreases, and, if the holder 12 is not employed, the spherical members 7 are, though a larger number of spherical members 7 can be received, to be scattered.

According to the third embodiment, the holder 12 becomes capable of allowing the speed difference between the spherical members 7 owing to the single elongate hole 12a extending in the axial direction, and can therefore stabilize the slide resistance. Further, the elimination of the pillar or partition from the holder 12 permits the number of the spherical members to increase so much for this elimination, and therefore the contact pressure for every spherical member 7 can be reduced.

Fourth Embodiment

Figure 9:
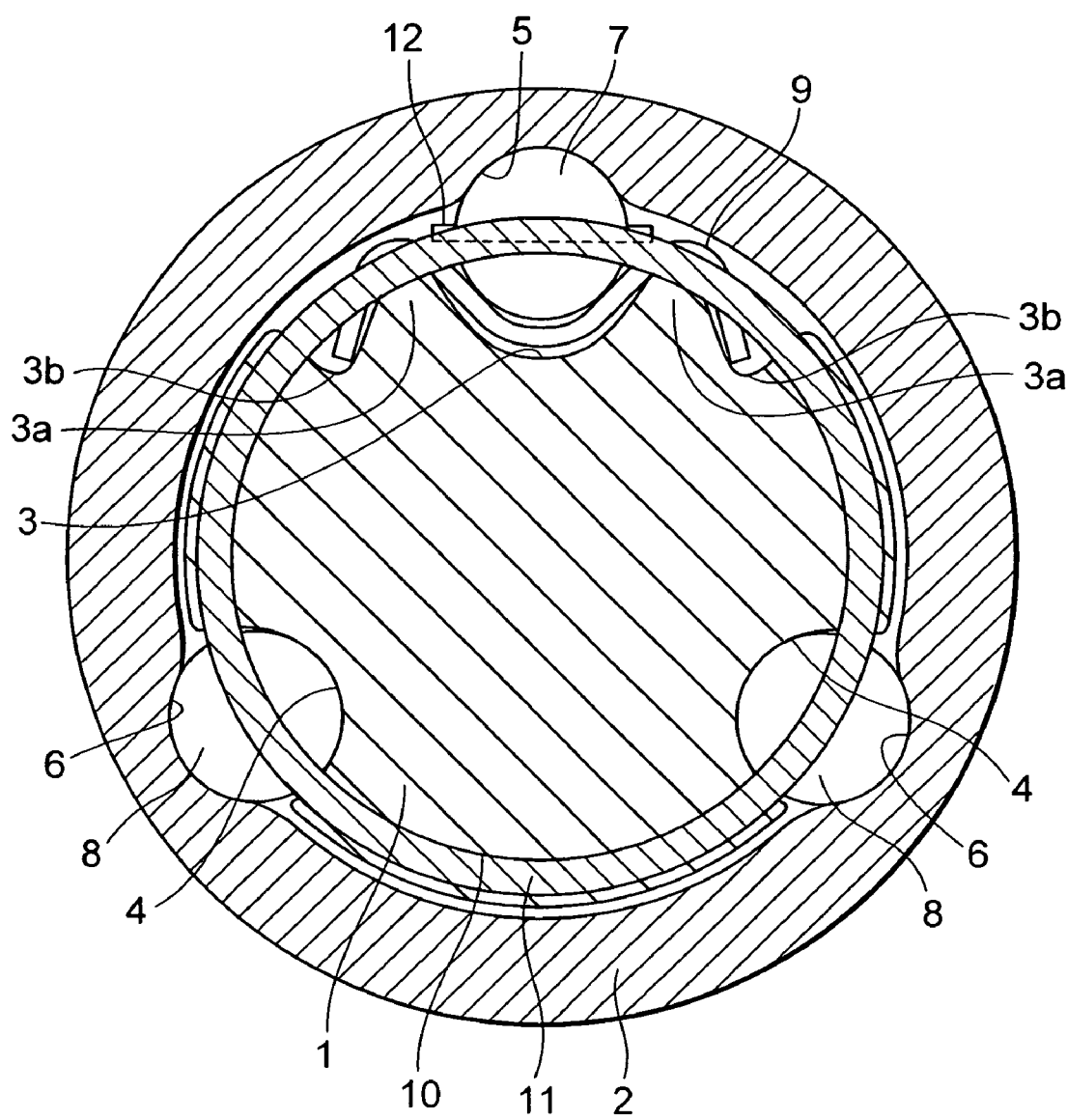
FIG. 9 is a cross sectional view of the telescopic shaft for the vehicle steering in the first embodiment of the present invention.
Figure 10:
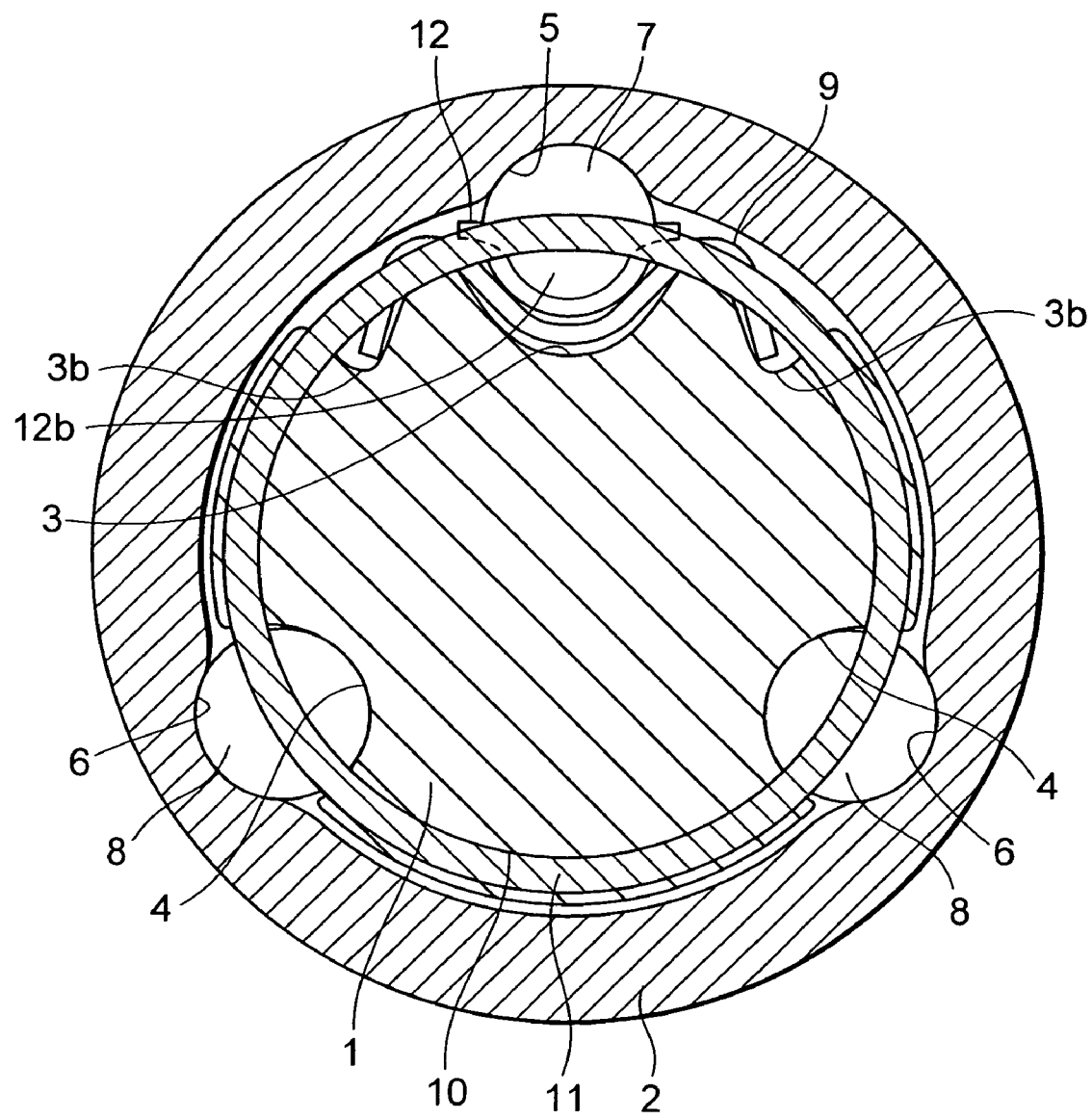
FIG. 10 is a cross sectional view of the telescopic shaft for the vehicle steering in a fourth embodiment of the present invention.
Figure 11:
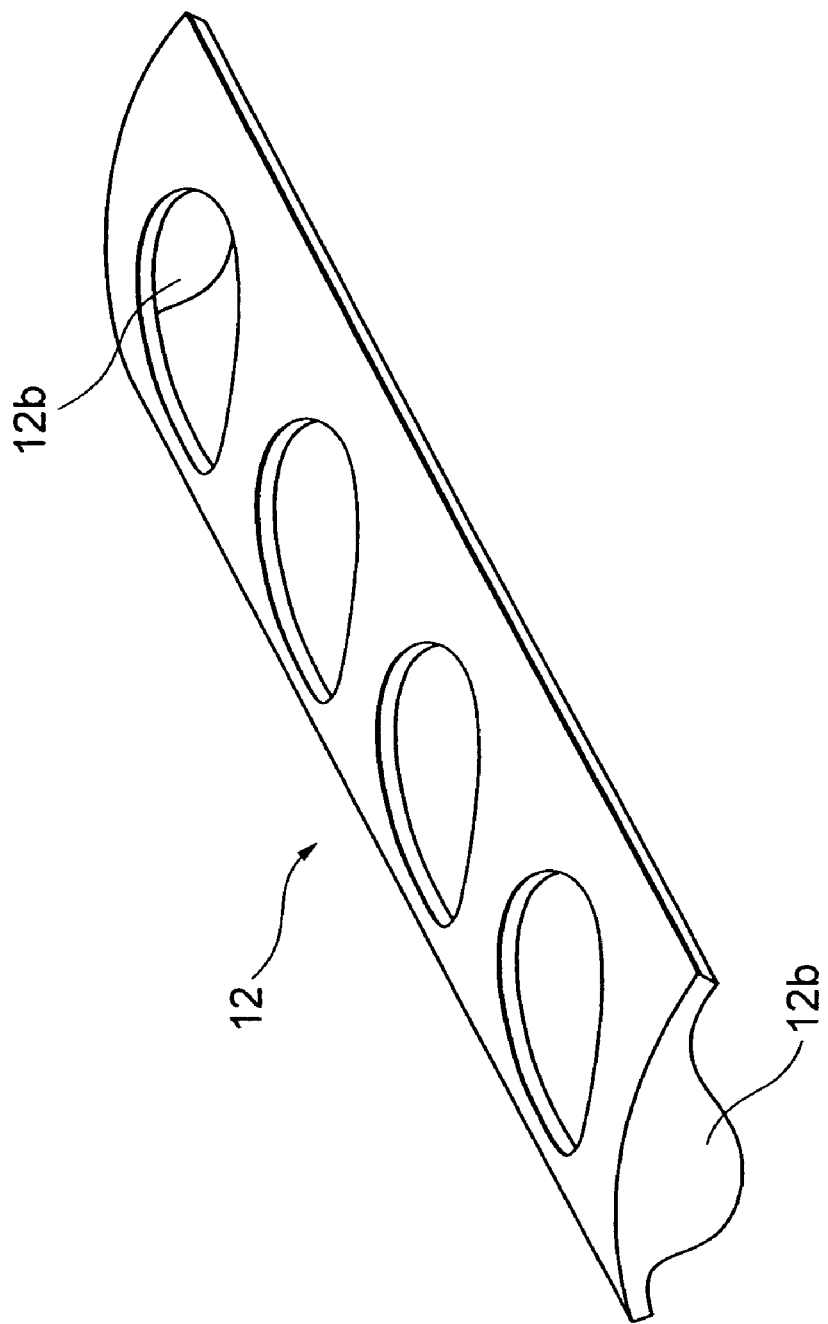
FIG. 11 is a perspective view of the holder shown in FIG. 10.

FIG. 9 is a cross sectional view of the telescopic shaft for the vehicle steering in the first embodiment of the present invention. FIG. 10 is a cross sectional view of the telescopic shaft for the vehicle steering in a fourth embodiment of the present invention. FIG. 11 is a perspective view of the holder shown in FIG. 10.

In the first embodiment (FIGS. 3 and 4) described above, the holder 12 disposed between the male shaft 1 and the female shaft 2 has the plurality of through-holes, and holds the spherical members 7. The holder 12, when the male shaft 1 and the female shaft 2 make the relative movements, also moves corresponding thereto, and this movement in the axial direction is regulated by the stopper ring 11 of the male shaft 1.

Figure 4:
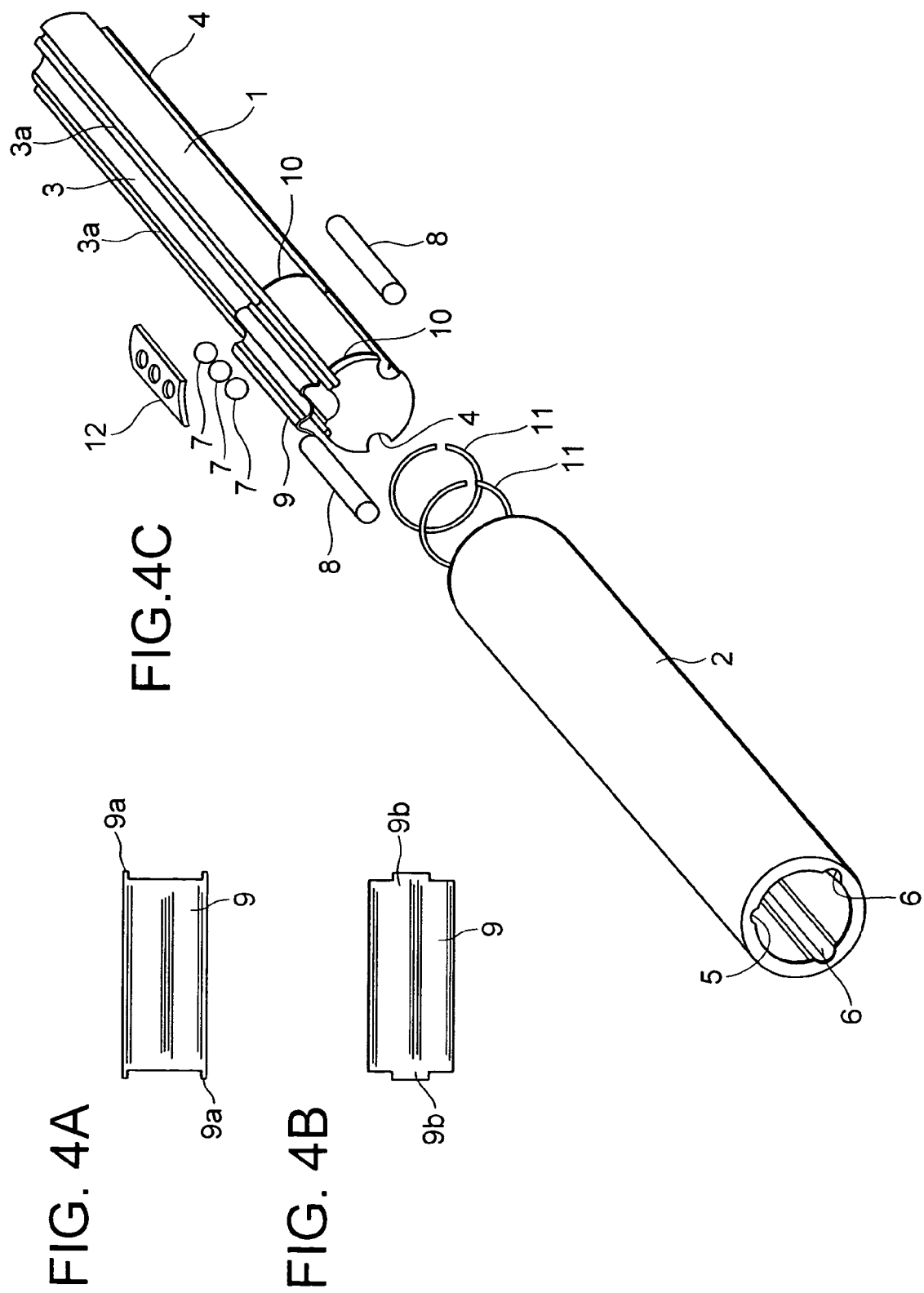
FIGS. 4A and 4B are plan views each showing an example of a plate spring.
FIG. 4C is a exploded perspective view of the telescopic shaft shown in FIG. 1.
Figure 5:
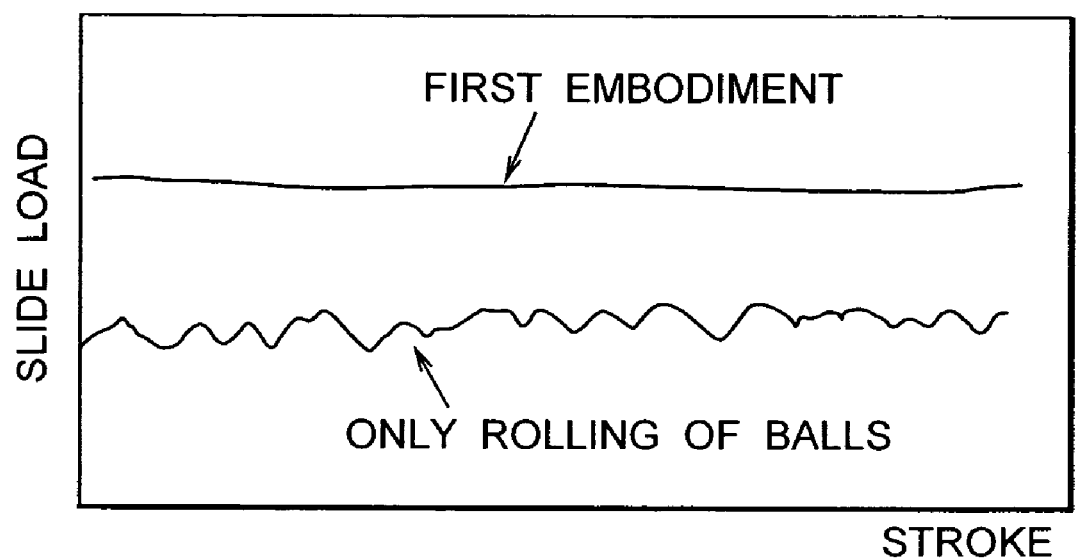
FIG. 5 is a graph showing a relationship between a stroke and a slide load of the telescopic shaft for the vehicle steering in the first embodiment.

As shown in FIGS. 3, 4 and 9, however, the holder 12 has its end surface that is just a simple cut surface, so that there would be a fear that this end surface, when moving, does not abut on the stopper ring 11, and the movement in the axial direction can not be regulated by the stopper ring 11.

Such being the case, according to the fourth embodiment, for purpose of making the holder 12 surely abut on the stopper ring 11, as shown in FIGS. 10 and 11, end portions of the holder 12 are respectively provided integrally with tongue pieces 12b. Note that the tongue pieces 12b are not limited to the configuration illustrated therein.

Thus, the holder 12 is provided integrally with the tongue pieces 12b spreading large at the end portions thereof. Accordingly, when the holder 12 moves, the tongue pieces 12b of the end surface thereof surely abuts on the stopper ring 11, whereby the movement in the axial direction can be surely regulated by the stopper ring 11 and the holder 12 can be prevented from being damaged.

Fifth Embodiment

First Example of Fifth Embodiment

Figure 12:
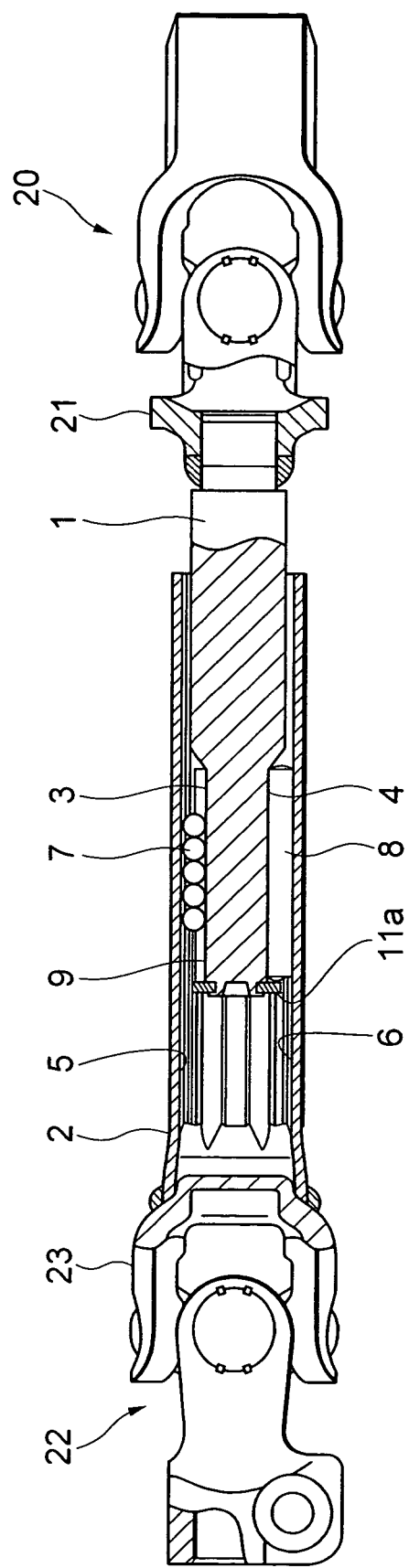
FIG. 12 is vertical sectional view of the telescopic shaft for the vehicle steering with a Cardan shaft joint in a first example of a fifth embodiment of the present invention.

FIG. 12 is a vertical sectional view of the telescopic shaft for the vehicle steering with a Cardan joint in a first example of a fifth embodiment of the present invention. FIGS. 13A through 13E are views each showing an example of the female shaft in the first example. FIG. 14 is a view showing the female shaft in the first example. FIGS. 15A through 15E are views each showing an example of the male shaft in the first example.

As shown in FIG. 12, according to the first example, as an intermediate shaft for the steering, the male shaft 1 is connected to a yoke 21 of a Cardan joint 20 on the side of the steering wheel, while the female shaft 2 is connected to a yoke 23 of a Cardan joint 22 on the side of a steering gear. Note that a stopper plate 11a is used as a substitute for the stopper ring 11. Other configurations and operations are the same as those in the embodiments discussed above.

The attachment on the side of the steering wheel and the attachment on the side of the steering gear may be reversed.

Next, FIGS. 13A through 13E and 14 show the examples of the female shaft 2 serving as the shaft for the steering.

Figure 13A:
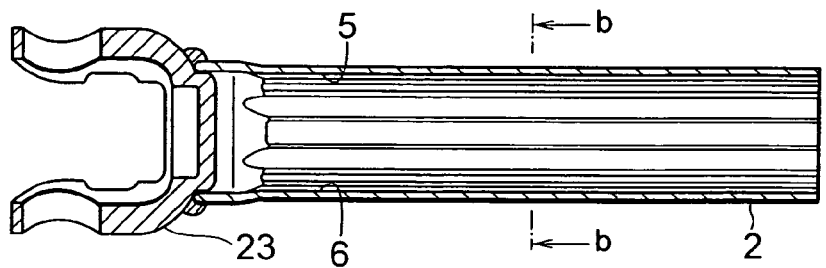
FIGS. 13A through 13E are views each showing an instance of the female shaft in the first example of the fifth embodiment.
Figure 13B:
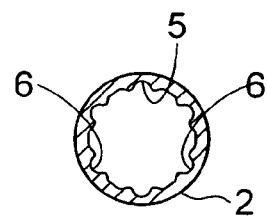
Figure 14:
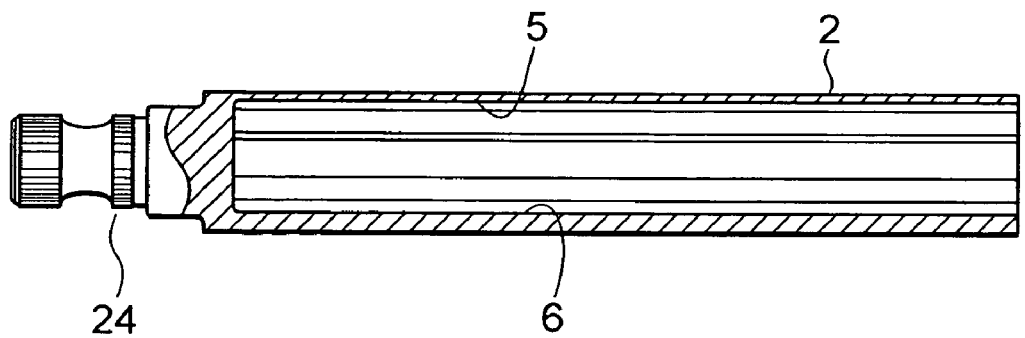
FIG. 14 is a view showing an instance of the female shaft in the first example of the fifth embodiment.

FIGS. 13A and 13B show the example of a sub-assembly state of the female shaft 2 and the yoke 23, wherein the yoke 23 is fitted into an inside diametrical portion of the female shaft 2, thus assembling them by welding. The female shaft 2 is constructed of a large-diameter cylindrical portion to which the yoke 23 is fitted and of a small-diameter cylindrical portion having axial groves 5, 6 formed in its inner surface.

Figure 13C:
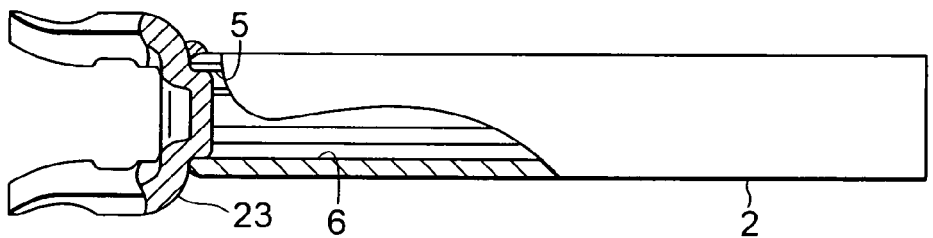

FIG. 13C shows another example of the sub-assembly state, wherein the female shaft 2 and the yoke 23 are fitted to each other, thus assembling them by welding. The female shaft 2 is formed with the axial grooves 5, 6 extending over its entire length.

Figure 13D:
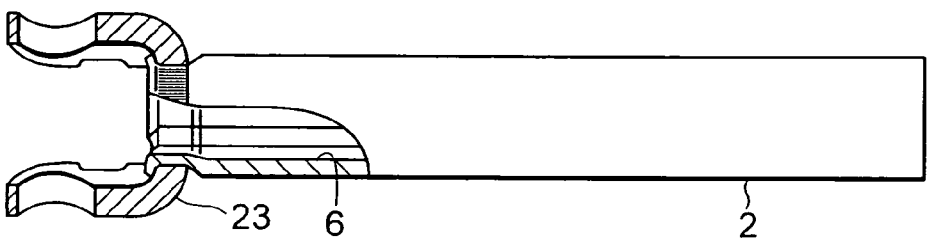

FIG. 13D shows still another example of the sub-assembly state, wherein a serration portion formed in the side end portion of the female shaft 2 is fitted to the yoke 23 and thereafter joined thereto by caulking a side endmost portion of the female shaft 2.

Figure 13E:
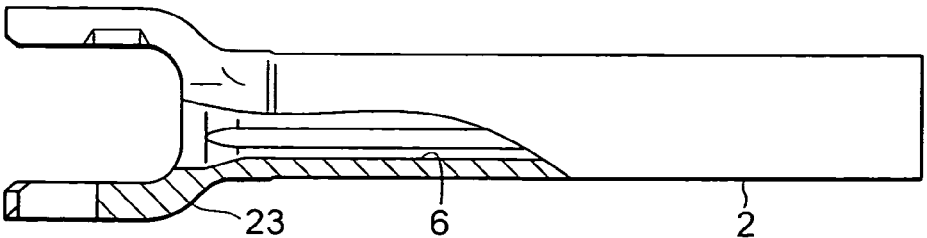

FIG. 13E shows yet another example equivalent to the sub-assembly, wherein the female shaft 2 and the yoke 23 are integrally molded by cold-molding, etc.

FIG. 14 shows a further example equivalent to the sub-assembly, wherein the female shaft 2 is constructed integrally with a shaft member 24 having, at its end portion, a serration for fitting a bolt fastening type yoke (unillustrated).

Next, FIGS. 15A through 15E show examples of the male shaft 1 as the intermediate shaft for the steering.

Figure 15A:
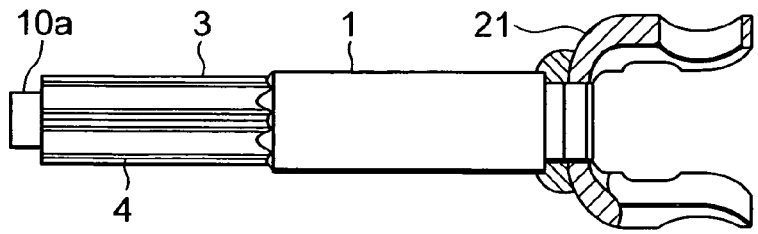
FIGS. 15A through 15E are views each showing an instance of the male shaft in first and second examples of the fifth embodiment.

FIG. 15A shows the example of a sub-assembly state of the male shaft 1 and the yoke 21, wherein the male shaft 1 is fitted into the yoke 21 and thereafter subjected to a welding work. The male shaft 1 has a stepped portion 10a to which the stopper plate 11a is attached.

Figure 15B:
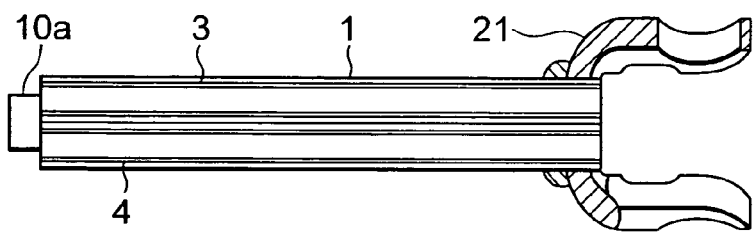

FIG. 15B shows the example of the sub-assembly state of the male shaft 1 and the yoke 21, wherein the male shaft 1 is fitted into the yoke 21 and thereafter subjected to the welding work. The male shaft 1 is formed with the axial grooves 3, 4 extending over the entire length.

Figure 15C:
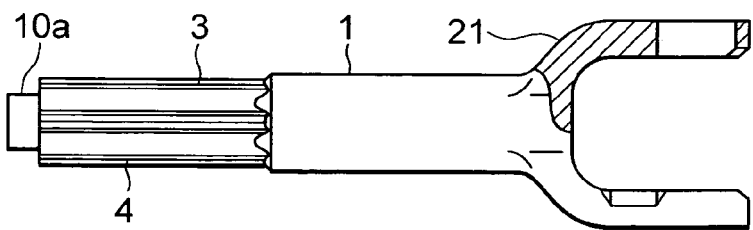

FIG. 15C shows another example equivalent to the sub-assembly, wherein the male shaft 1 and the yoke 21 are integrally molded by the cold-molding, etc.

Figure 15D:
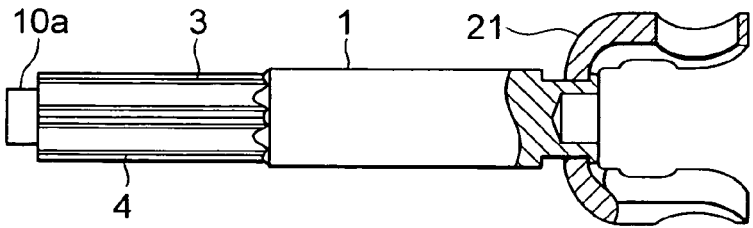

FIG. 15D shows an example of the sub-assembly state of the male shaft 1 and the yoke 21, wherein a serration portion formed in the end portion of the male shaft 1 is fitted into the yoke 21 and thereafter joined to the yoke 21 by caulking an endmost portion of the male shaft 1.

Figure 15E:
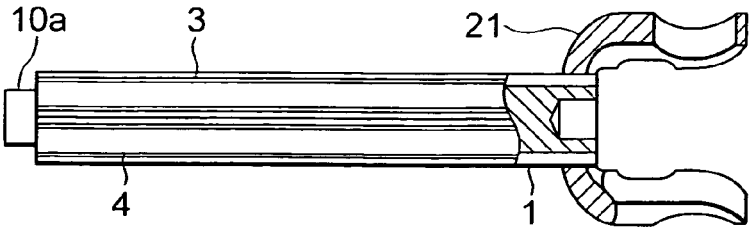

FIG. 15E shows an example of the sub-assembly state of the male shaft 1 and the yoke 21, wherein the end portion of the male shaft 1 is fitted into the yoke 21 and thereafter joined to the yoke 21 by caulking the endmost portion of the male shaft 1. The male shaft 1 is formed with the axial grooves 3, 4 extending over its entire length.

Second Example of Fifth Embodiment

Figure 16:
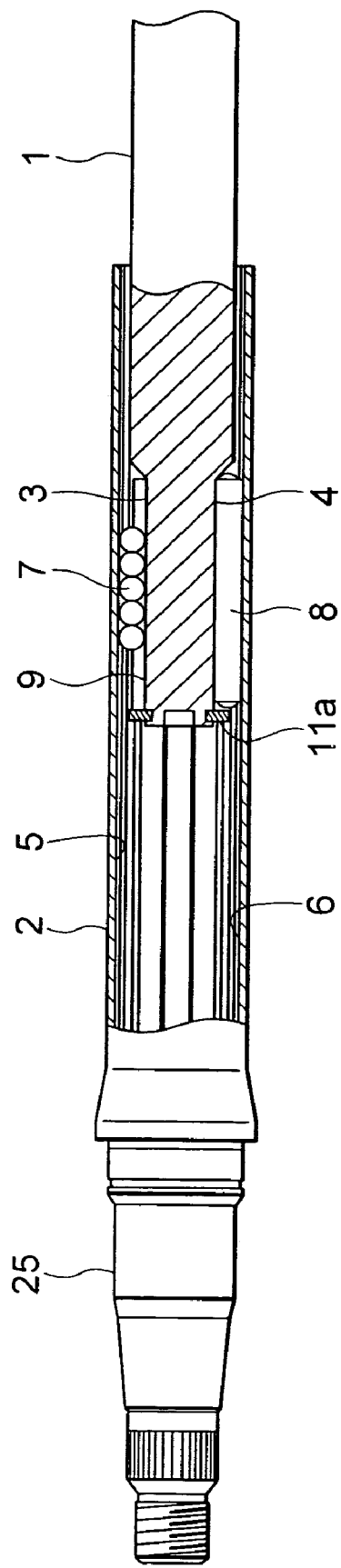
FIG. 16 is a vertical sectional view of the telescopic shaft for the vehicle steering in THE second example of the fifth embodiment of the present invention.
Figure 17:
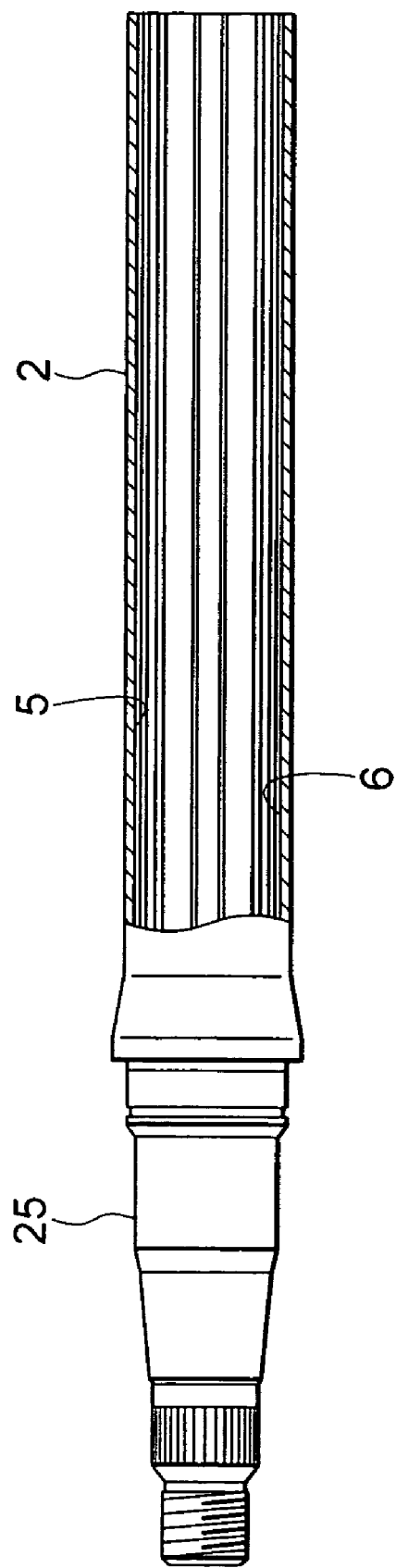
FIG. 17 is a vertical sectional view of the female shaft illustrated in FIG. 16.

FIG. 16 is a vertical sectional view of the telescopic shaft for the vehicle steering in a second example of the fifth embodiment of the present invention. FIG. 17 is a vertical sectional view of the female shaft illustrated in FIG. 16. Note that FIGS. 15A through 15E are views each showing an example of the male shaft in the second example.

As shown in FIGS. 16 and 17, in the second embodiment, the female shaft 2 as the main shaft for the steering is constructed integrally with the shaft member 25. This shaft member 25 has such a contrivance that the steering wheel (unillustrated) is attached to its end portion. The telescopic shaft in the second embodiment is utilized as a steering shaft having a telescopic function.

Next, FIGS. 15A through 15E show the examples of the male shaft 1 as the main shaft for the steering.

FIG. 15A shows the example of a sub-assembly state of the male shaft 1 and the yoke 21, wherein the male shaft 1 is fitted into the yoke 21 and thereafter subjected to the welding work. The male shaft 1 has the stepped portion 10a to which the stopper plate 11a is attached.

FIG. 15B shows the example of the sub-assembly state of the male shaft 1 and the yoke 21, wherein the male shaft 1 is fitted into the yoke 21 and thereafter subjected to the welding work. The male shaft 1 is formed with the axial grooves 3, 4 extending over the entire length.

FIG. 15C shows another example equivalent to the sub-assembly, wherein the male shaft 1 and the yoke 21 are integrally molded by the cold-molding, etc.

FIG. 15D shows an example of the sub-assembly state of the male shaft 1 and the yoke 21, wherein the serration portion formed in the end portion of the male shaft 1 is fitted into the yoke 21 and thereafter joined to the yoke 21 by caulking the endmost portion of the male shaft 1.

FIG. 15E shows the example of the sub-assembly state of the male shaft 1 and the yoke 21, wherein the end portion of the male shaft 1 is fitted into the yoke 21 and thereafter joined to the yoke 21 by caulking the endmost portion of the male shaft 1. The male shaft 1 is formed with the axial grooves 3, 4 extending over its entire length.

Sixth Embodiment

Figure 18:
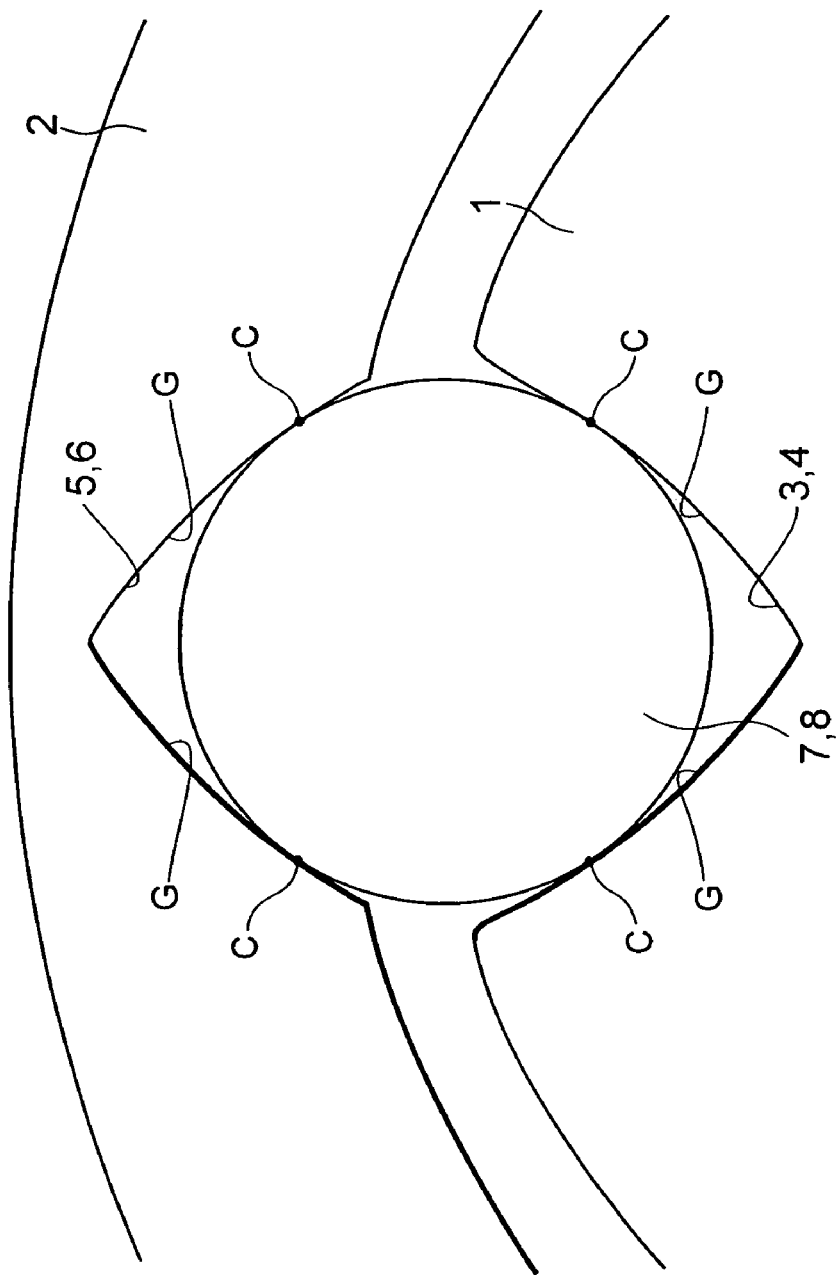
FIG. 18 is a cross sectional view of a principal portion of the telescopic shaft for the vehicle steering in the prior art.

FIG. 18 shows a cross sectional view of a principal portion of the telescopic shaft for the vehicle steering by way of one example of the prior art. FIG. 19 is a cross sectional view of a principal portion of the telescopic shaft for the vehicle steering in a sixth embodiment of the present invention. Pairs of axial grooves 3, 4 and 5, 6 on which the ball 7 and the needle roller 8 abut, are formed respectively in a predetermined curved-surface shape (e.g., a Gothic arched shape) as a groove configuration. This is also disclosed in, for example, Japanese Patent Application Laid-Open Publication No. 2001-50293.

As shown in FIG. 18, in a case where the groove configuration of the axial grooves 3 through 6 is formed in the predetermined curved-surface shape (G, Gothic Arched shape), the ball 7 and the needle roller 8 abut thereon at contact points (C), and what will be given as below can be said with respect to an initial contact angle, a torsion rigidity and a contact pressure (Pmax).

As for the initial contact angle, if a (±) torque is loaded, the balls 7 and the needle roller 8 move along on the axial grooves 3 through 6 taking the curved-surface configuration (G, Gothic arch) in a way that changes the contact angle (point). At this time, if the torque is loaded in forward→reversed directions, a friction affects the ball 7 and the needle roller 8 to stay there. As a result, a hysteresis occurs in the torsion rigidity. Due to a scatter in tolerance, as the contact point (C) of the ball 7 or the needle roller 8 gains a nearer vicinity to the bottom of the groove, the contact angle becomes shallower and the hysteresis becomes larger. Further, a contact angle in a nominal design position is hard to obtain.

As for the torsion rigidity, the rigidity is low in a low torque area, however, as the torque increases, the contact point changes and the contact angle becomes higher. Hence, a high rigidity is acquired in a high torque area.

As for the contact pressure (Pmax), in low-high torque states, a contact ellipse is formed, and hence a rise in contact surface pressure of especially the ball 7 can be restrained.

Thus, in the case where the groove configuration of the axial grooves 3 through 6 is formed in the curved-surface shape (G, Gothic arched shape), the torsion rigidity and the contact pressure (Pmax) are excellent in the high torque area.

When assembling, however, as for the initial contact angle, it might occur that the ball 7, etc. does not always abut on the same position within the axial groove 3, etc. due to a configuration error (tolerance) gap Min-Max when the ball 7, etc. is made to abut on the axial groove 3, etc. formed in the curved-surface shape, and the initial contact angle can not be necessarily ensured.

Under such a circumstance, there is a demand for surely ensuring the initial contact angle at the time of assembly (torque 0) in a way that makes use of the curved-surface shape (G. Gothic arched shape) exhibiting the excellent torsion rigidity and contact pressure (Pmax) in the high torque area.

According to the sixth embodiment, as shown in FIG. 19, shallow areas of the axial grooves 3 through 6 are formed in the curved-surface shape (G, Gothic arched shape), while deep areas thereof are formed in a flat shape (F), wherein, e.g., the spherical member 7 as the first torque transmitting member and, e.g., the cylindrical member 8 as the second torque transfer member abut on the groove in the vicinity of a boundary point between the curved area and the flat area thereof.

Thus, the area deeper than a contact point (C) is formed in the flat shape (F), and therefore, when assembling, the spherical member 7 and the cylindrical member 8 are not affected by the configuration error (tolerance) gap Min-Max, whereby a desired contact angle or a contact angle more than desired can be surely ensured.

Thus, what will be given as below can be said in a case where the curved-surface shape (G, Gothic arched shape) is combined with the flat shape (F).

Concerning the initial contact angle, at the time of assembly, in case the spherical member 7 and the cylindrical member 8 abut on the flat area (F), it is easy to obtain the initial (design) contact angle without being affected by a scatter in tolerance in the radial direction.

Concerning the torsion rigidity, in the low torque area, since the spherical member 7 and the cylindrical member 8 abut on the flat shape (F), the initial contact angle as the design value manifests is obtained, and hence the high torsion rigidity is acquired.

On the other hand, in the area where the groove configuration takes the flat shape (F), if the torque becomes high, an elastic deformation occurs, and a torsion quantity increases. Hence, in the high torque area, the rigidity becomes lower than in the Gothic arched shape.

According to the sixth embodiment, however, the curved-surface shape (G, Gothic arched shape) is combined with the flat shape (F). Therefore, the spherical member 7 and the cylindrical member 8 abut on the curved-surface shape (G, Gothic arched shape) exhibiting the excellent torsion rigidity, wherein as the torque rises, the contact point changes and the contact angle becomes high. Hence, even in the high torque area, the high rigidity is obtained.

Concerning the contact pressure (Pmax), in the area where the groove configuration takes the flat shape (F), the contact pressure of the ball becomes higher as the torque rises.

According to the sixth embodiment, however, when the torque is applied, the contact points of the spherical member 7 and the cylindrical member 8 gradually move onto the curved-surface shape (G, Gothic arched shape), and therefore the rise in the contact pressure can be restrained.

From the above-mentioned, in the sixth embodiment, the curved-surface shape (G, Gothic arched shape) is combined with the flat shape (F), so that in the low torque area, the spherical member 7 and the cylindrical member 8 abut on the flat shape (F), the initial contact angle as the design value manifests is obtained, and the high torsion rigidity is acquired; and on the other hand, in the high torque area, the spherical member 7 and the cylindrical member 8 abut on the curved-surface shape (G, Gothic arched shape), the high rigidity is obtained, and, as for the contact pressure (Pmax), the increase in the contact pressure can be restrained.

Seventh Embodiment

Figure 20A:
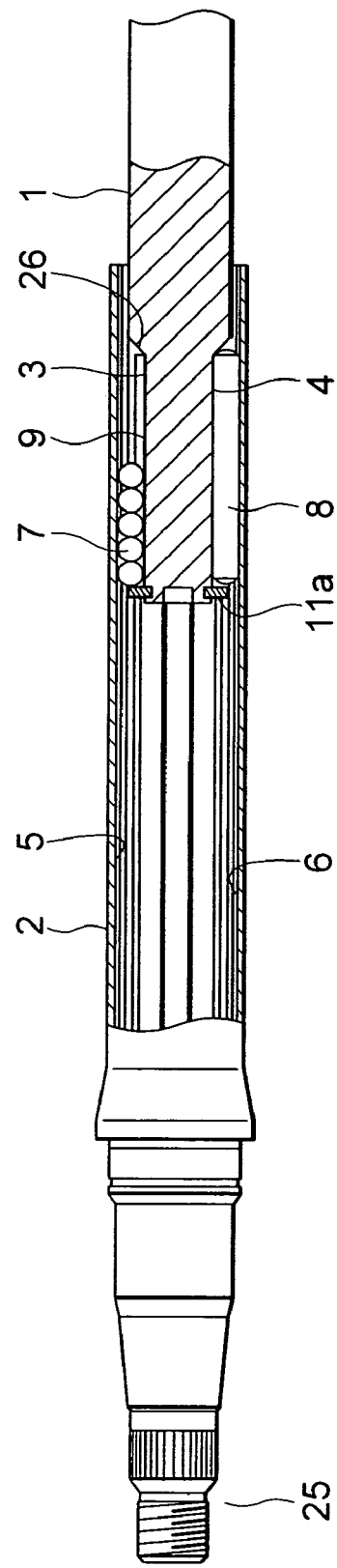
FIGS. 20A and 20B are respectively vertical sectional views of the telescopic shaft for the vehicle steering in a seventh embodiment of the present invention, showing a collapsible state when a secondary collision of the vehicle happens.
Figure 20B:
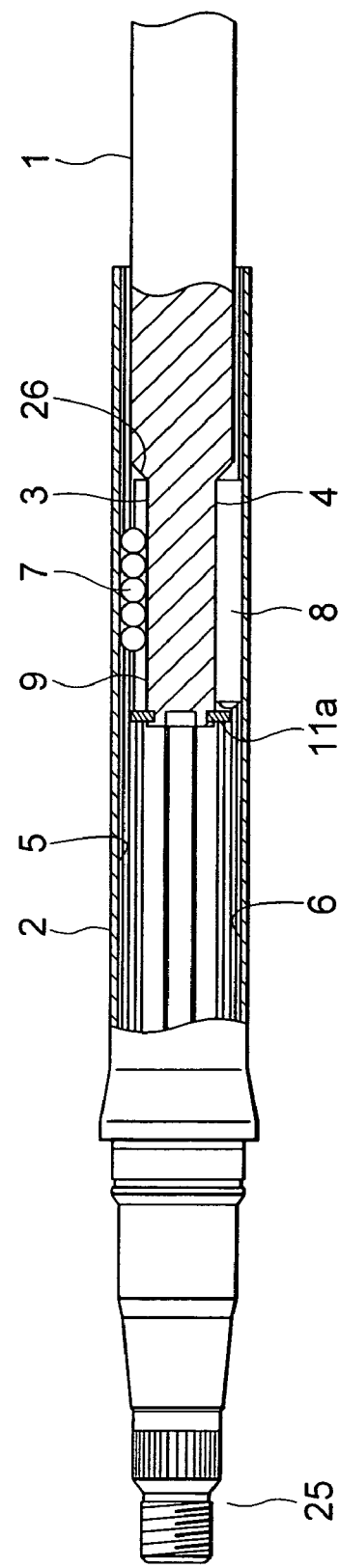

FIGS. 20A and 20B are respectively vertical sectional views of the telescopic shaft for the vehicle steering in a seventh embodiment of the present invention, showing a collapsible state when a secondary collision of the vehicle happens. FIGS. 21A and 21B are vertical sectional views of the telescopic shaft for the vehicle steering illustrated in FIG. 20, showing the collapsible state when the secondary collision of the vehicle happens. FIGS. 22A through 22D are graphs each showing a relationship between the stroke and the slide load of the telescopic shaft for the vehicle steering shown in FIGS. 20 and 21.

As a technical background of the seventh embodiment, the telescopic shaft for the vehicle steering is slidable (telescopic) in the axial direction with a comparatively low and stable slide load (for instance, 50 N or under) for a telescopic adjustment.

On the other hand, when the secondary collision of the vehicle happens, an impact energy of the secondary collision that is exerted towards the front from the rear of the vehicle, is absorbed by generating a high slide load with an impact absorption mechanism provided in the steering column.

The impact absorption by only the column-sided impact absorption mechanism brings about upsizing this impact absorption mechanism, and so forth. Therefore, in order to attain downsizing and decrease a weight of this column-sided impact absorption mechanism, there is a demand for supplementing the column-sided impact absorption mechanism by having a role of absorbing the impact energy performed on the part of the steering shaft also.

Under such a circumstance, according to the seventh embodiment, as shown in FIGS. 20 and 21, or as explained in the embodiments discussed above, there are interposed between the male shaft 1 and the female shaft 2, for example, the spherical members 7 as the first torque transmitting members biased by, e.g., the plate spring 9 as the elastic member and the two pieces of, e.g., cylindrical members 8 as the second torque transmitting members. With this arrangement, at a normal time, the telescopic function and a displacement absorbing function of the car body are exhibited with a low slide load. On the other hand, when the secondary collision happens, the impact energy generated upon the secondary collision is supplementally absorbed by generating a high slide load.

To be specific, when the secondary collision happens, the telescopic shaft of the steering shaft becomes collapsed, as seen in the sequence such as FIG. 20A→FIG. 20B→FIG. 21A→FIG. 21B, by the impact energy exerted from the rear towards the front of the vehicle.

Figure 22A:
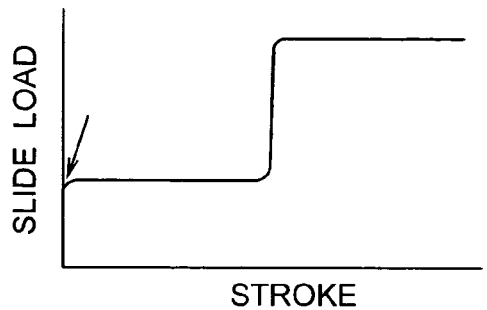
FIGS. 22A through 22D are graphs each showing a relationship between the stroke and the slide load of the telescopic shaft for the vehicle steering shown in FIGS. 20 and 21.
Figure 22B:
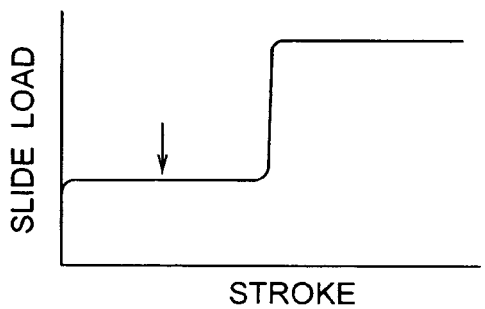
Figure 22C:
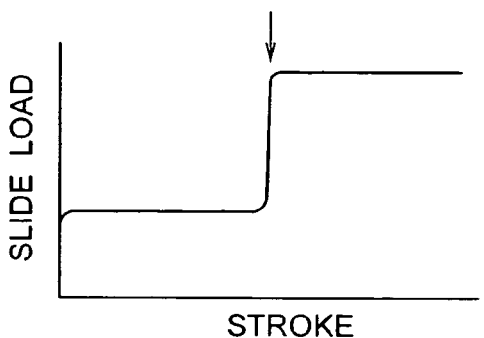
Figure 22D:
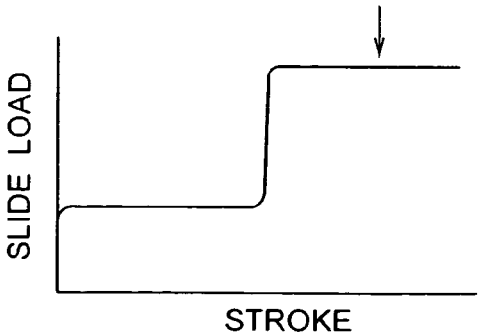

Further, among the drawings in FIG. 22, FIG. 22A shows a state in FIG. 20A, FIG. 22B shows a state in FIG. 20B, FIG. 22C shows a state in FIG. 21A, and FIG. 22D shows a state in FIG. 21B.

The states shown in FIGS. 20A and 20B (corresponding to FIGS. 22A and 22B) are states at the normal time, wherein the telescopic function and the displacement absorbing function of the car body are exhibited with the low slide load. There work both the rolling function of the spherical members 7 and the slide function of the cylindrical members 8. The slide load can be therefore restrained low.

Upon a start of the secondary collision, the telescopic shaft is stroked in its collapsing direction in the sequence such as FIG. 20A→FIG. 20B→FIG. 21A. As shown in FIG. 21A, the spherical member 7 eventually abuts on a groove end portion (a cut-up portion) 26 of the male shaft 1 and is thereby unable to roll any more. On this occasion, as illustrated in FIG. 22C, the high slide load occurs to initiate the supplemental absorption of the impact energy.

As shown in FIG. 21B, when the male shaft 1 is intruded with a much stronger load, the spherical members 7 start sliding between the female shaft 2 and the groove. With this operation, the telescopics and the contractions of the telescopic shaft all turn out sliding motions, whereby, as shown in FIG. 22D, the high slide load can be acquired. Thus, when the secondary collision happens, the high slide load is generated, thereby enabling the supplemental absorption of the impact energy caused by the secondary collision.

From the above-mentioned, the steering shaft is also made to perform the role of absorbing the impact energy when the secondary collision happens, thus supplementing the column-sided impact absorption mechanism. Consequently, the downsizing and the reduction in weight of the column-sided impact absorption mechanism can be attained.

Moreover, the column-sided impact absorption mechanism is combined with the impact absorption mechanism on the side of the steering shaft in the seventh embodiment, whereby an impact energy absorption timing can be staggered. With this contrivance, at the initial stage of the collision, the energy absorption with the low load is not conducted by the shaft-sided absorption mechanism in the seventh embodiment, and, as the stroke progresses, the main absorption mechanism on the column side can absorb the energy with the high load. The impact energy can be thereby absorbed at a high efficiency within the limited space. Further, there is a case where the system might work well depending on how to combine with other restrictive supplement devices such as an airbag system, a seatbelt, etc. if the main energy absorption mechanism is not particularly provided. This enables a further reduction in weight and a further cost-down as well.

Note that the functions in the seventh embodiment are available for the intermediate shaft for the steering. The intermediate shaft can be separately utilized as follows. In the low slide load range, the intermediate shaft is utilized for improving the assembling characteristic to the vehicle or absorbing a relative displacement of the car body and for, in the high slide load range, absorbing the energy caused by the primary or secondary collision.

Eighth Embodiment

Figure 23A:
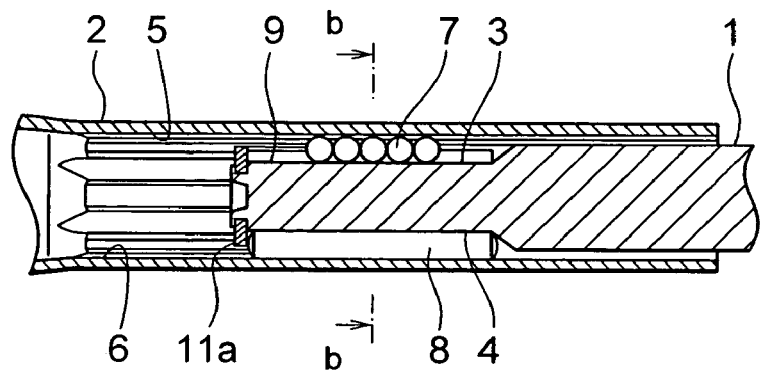
FIG. 23A is a vertical sectional view of the telescopic shaft for the vehicle steering in an eighth embodiment of the present invention.
Figure 23B:
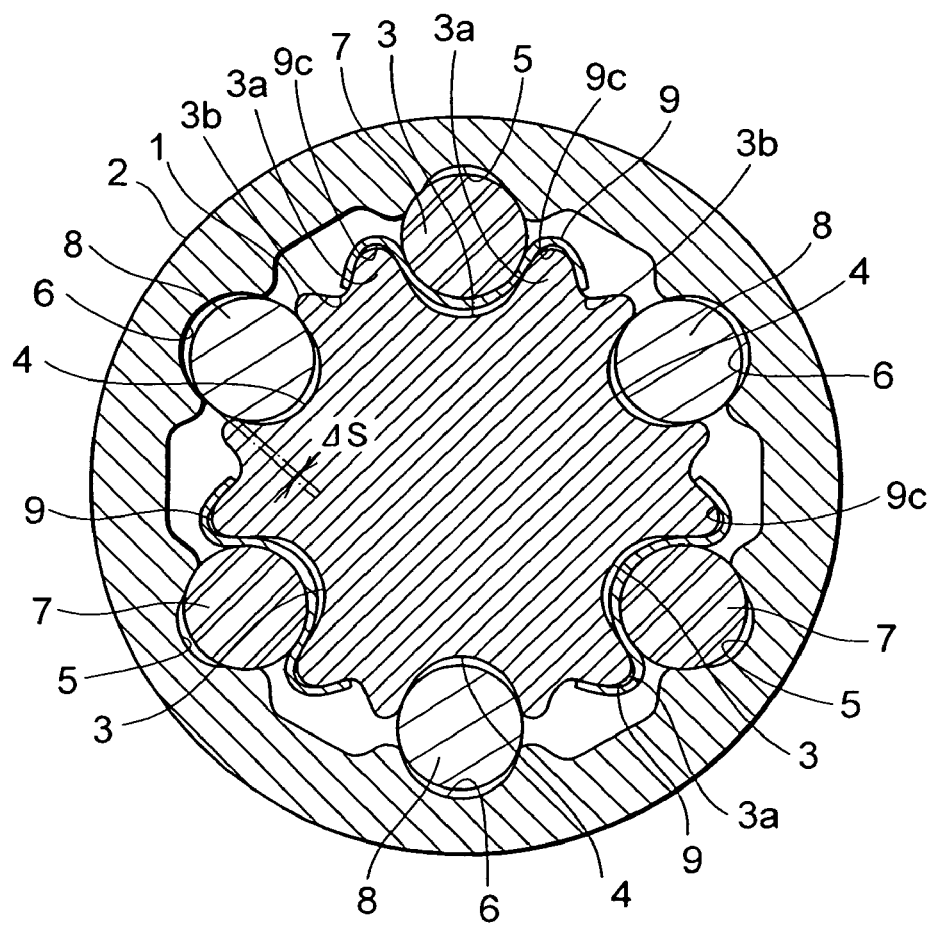
FIG. 23B is a cross sectional view taken along the line b-b in FIG. 23A.
Figure 24:
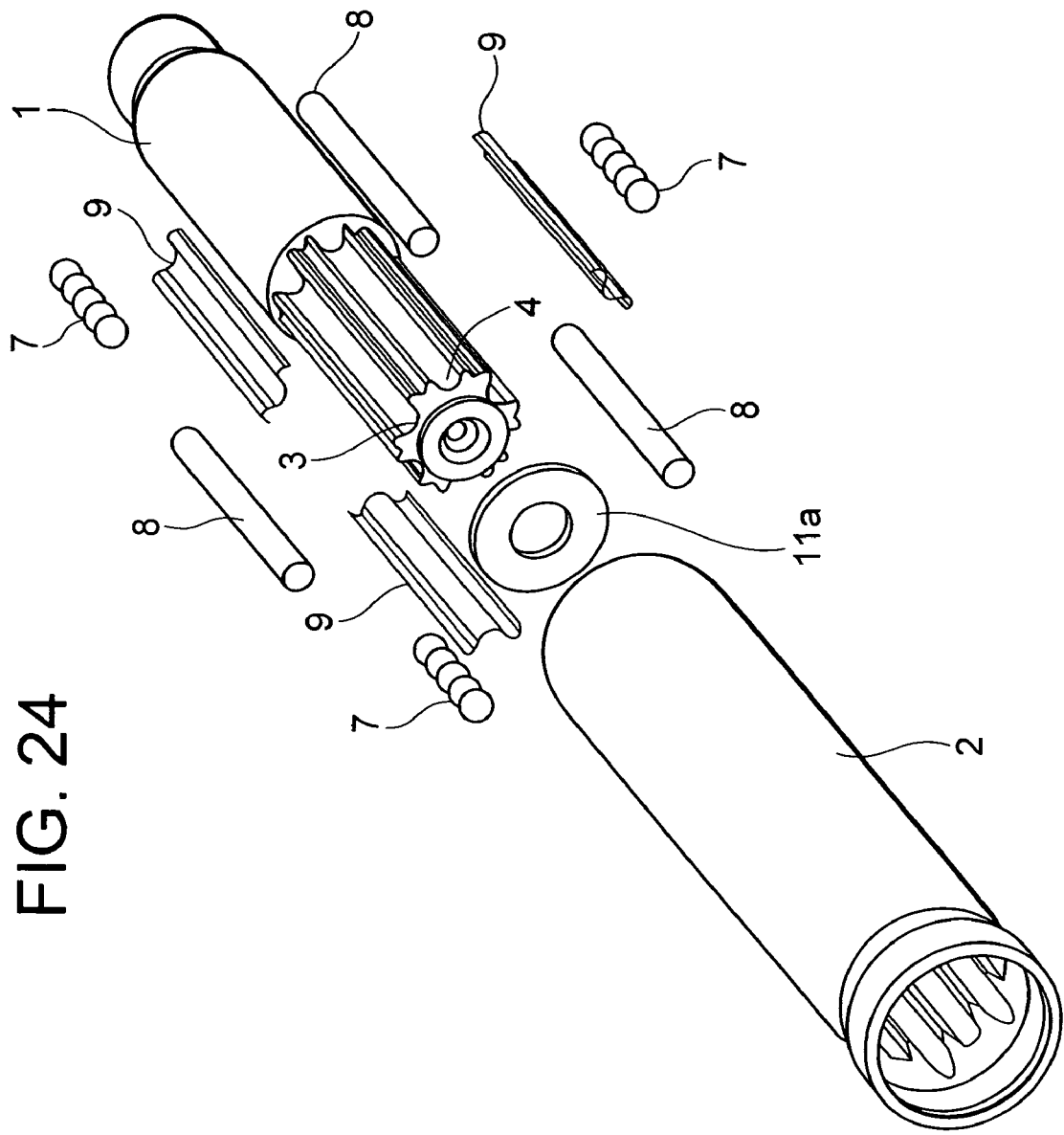
FIG. 24 is an exploded perspective view of the telescopic shaft for the vehicle steering in the eighth embodiment.

FIG. 23A is a vertical sectional view of the telescopic shaft for the vehicle steering in an eighth embodiment of the present invention. FIG. 23B is a cross sectional view taken along the line b-b in FIG. 23A. FIG. 24 is an exploded perspective view of the telescopic shaft for the vehicle steering in the eighth embodiment.

Figure 25:
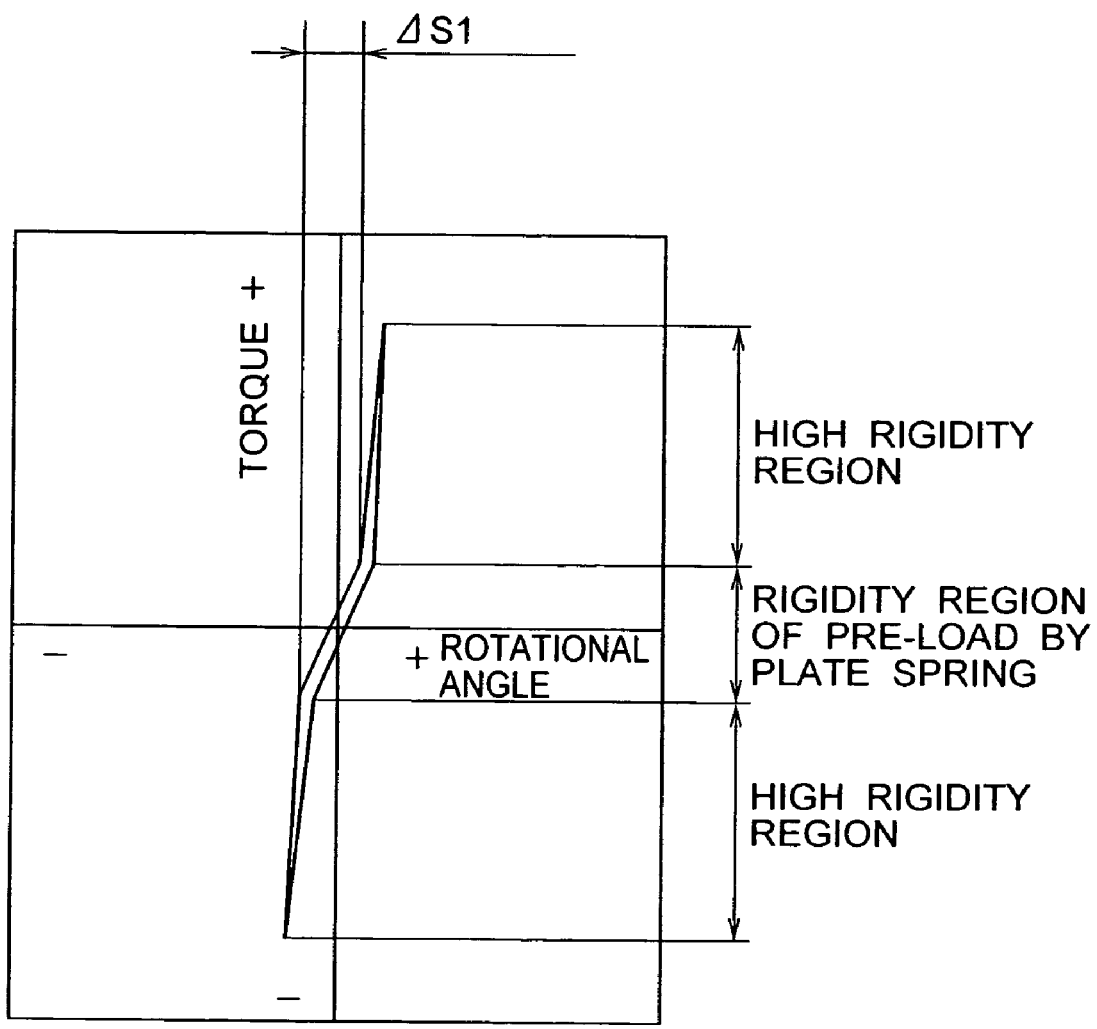
FIG. 25 is a graph (a characteristic line graph obtained when fixing one side end of the male or female shaft and inputting a torque from the other side end) showing a relationship between a rotational angle and the torque of the telescopic shaft.
Figure 26:
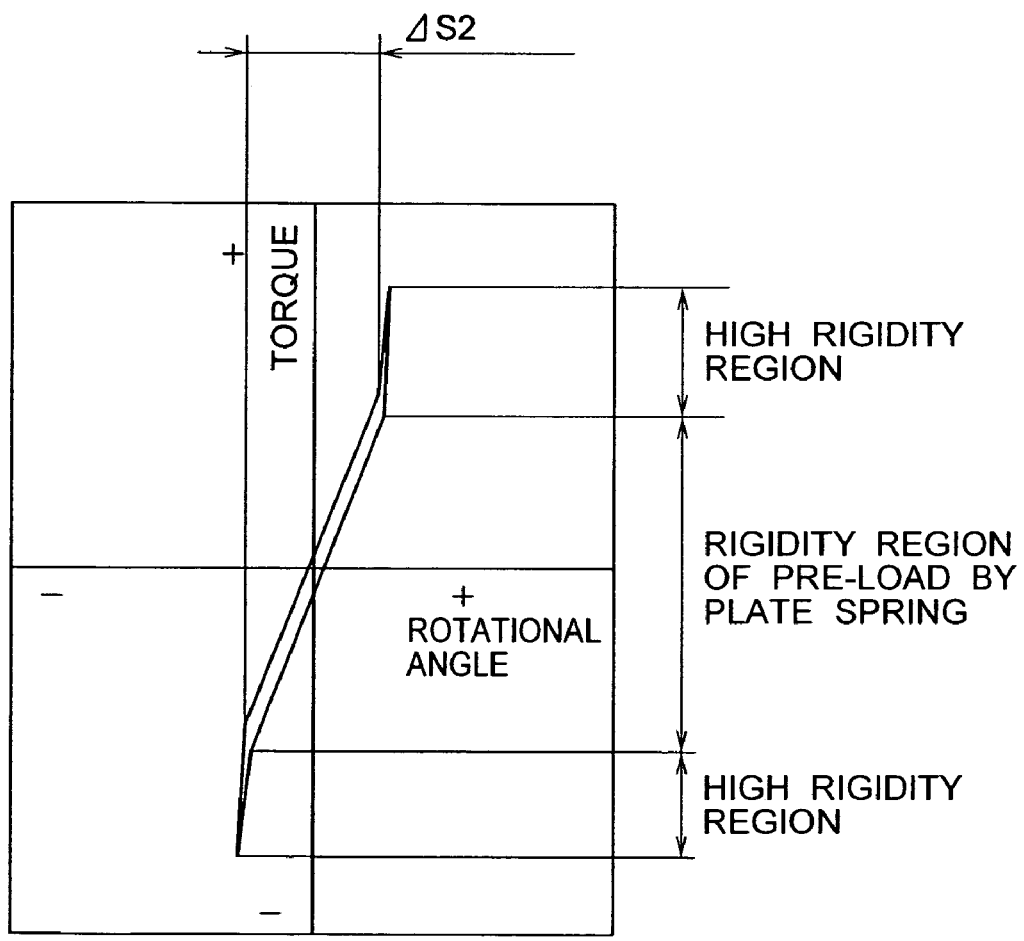
FIG. 26 is a graph showing a relationship between the rotational angle and the torque of the telescopic shaft.

FIGS. 25 and 26 are graphs (characteristic line graphs obtained when fixing one end of the male or female shaft and inputting the torque from the other end) each showing a relationship between a rotational angle and the torque of the telescopic shaft.

In the first embodiment discussed above, one pair of first torque transmitting members 7 are disposed in one pair of axial grooves 3, 5, and the two pieces of second torque transmitting members are disposed in the two pairs of axial grooves 4, 6 arranged at the equal interval of 120 degrees in the peripheral direction with respect to the one pair of axial grooves 3, 5.

By contrast with this arrangement, according to the eighth embodiment, as shown in FIG. 23, the spherical members 7 as the first torque transmitting members are disposed in three pairs of axial grooves arranged at the equal interval of 120 degrees in the peripheral direction respectively through the plate springs 9 as the elastic members, thus structuring a first torque transmitting device. The cylindrical members 8 as the second torque transmitting members are disposed in three pairs of axial grooves 4, 6 disposed at a 60-degree interval in the peripheral direction between those three pairs of axial grooves 3, 5, thus structuring a second torque transmitting device.

As a technical background for the eighth embodiment, a variety of characteristics of the torsion rigidity are needed because of a difference in terms of its performance requested of every vehicle. Each time this requested characteristic was changed, a flexibility to the requested characteristic has hitherto been acquired by changing the structure such as changing a diameter of the shaft or using the elastic member.

In those cases, however, parts having various types of structures and different elastic characteristics must be prepared, resulting in increases in the number of parts and in the cost as well.

Such being the case, according to the eighth embodiment, as the cylindrical members 8 can be manufactured at a low cost in a way that changes the outside diameter thereof on the several-micron basis, an interval between the male shaft, the cylindrical member 8 and the female shaft 2 can be arbitrarily set by properly selecting the diameter of the cylindrical member 8 or combining the diameters thereof. This contrivance enables an easy adjustment of the characteristic of the torsion rigidity of the telescopic shaft as will hereinafter be noted.

For instance, in the case of selecting the cylindrical member 8 having a comparatively large diameter, as shown in FIG. 23B, let ΔS be a gap between the male shaft 1 and the cylindrical member 8 or between the cylindrical member 8 and the female shaft 2, and a characteristic of ΔS appears to be ΔS1 as shown in the characteristic line graph of the torsion rigidity in FIG. 25.

ΔS1 is a region where mainly the plate spring 9 is flexural and is a region where a spring characteristic of the plate spring 9 appears. Note that when the torque is loaded, the cylindrical member 8 abuts strong, and the torsion rigidity becomes by far higher than in the region of the plate spring 9.

As described above, in the case where the cylindrical member 8 having the comparatively large diameter is selected and ΔS is small, the region in which the plate spring 9 works is small, and hence the torsion rigidity of the whole telescopic shaft increases. The spring characteristic of the plate spring 9 has an influence on a feeling when steering. Hence, in this case, the heterogeneous sounds and the vibrations do not cause problems, that is preferable to a case in which a sharp feeling of the high rigidity is requested, and the low rigidity region can be reduced to the greatest possible degree.

Inversely, in the case of selecting the cylindrical member 8 having a comparatively small diameter, ΔS increases, and, as indicated by ΔS2 in FIG. 26, the region in which the plate spring 9 works becomes large. Therefore, that is preferable to a case in which the heterogeneous sounds, the vibrations, etc. transferred from the road surface and from the power steering are made difficult to transmit to the handle as a steering feeling, and the low rigidity region where the plate spring 9 works can be taken large.

From the above-mentioned, according to the eighth embodiment, the variety of requests different depending on the characteristics of the vehicles as described above, can be met at a low cost without changing the basic structure nor increasing the number of parts.

Ninth Embodiment

Figure 27:
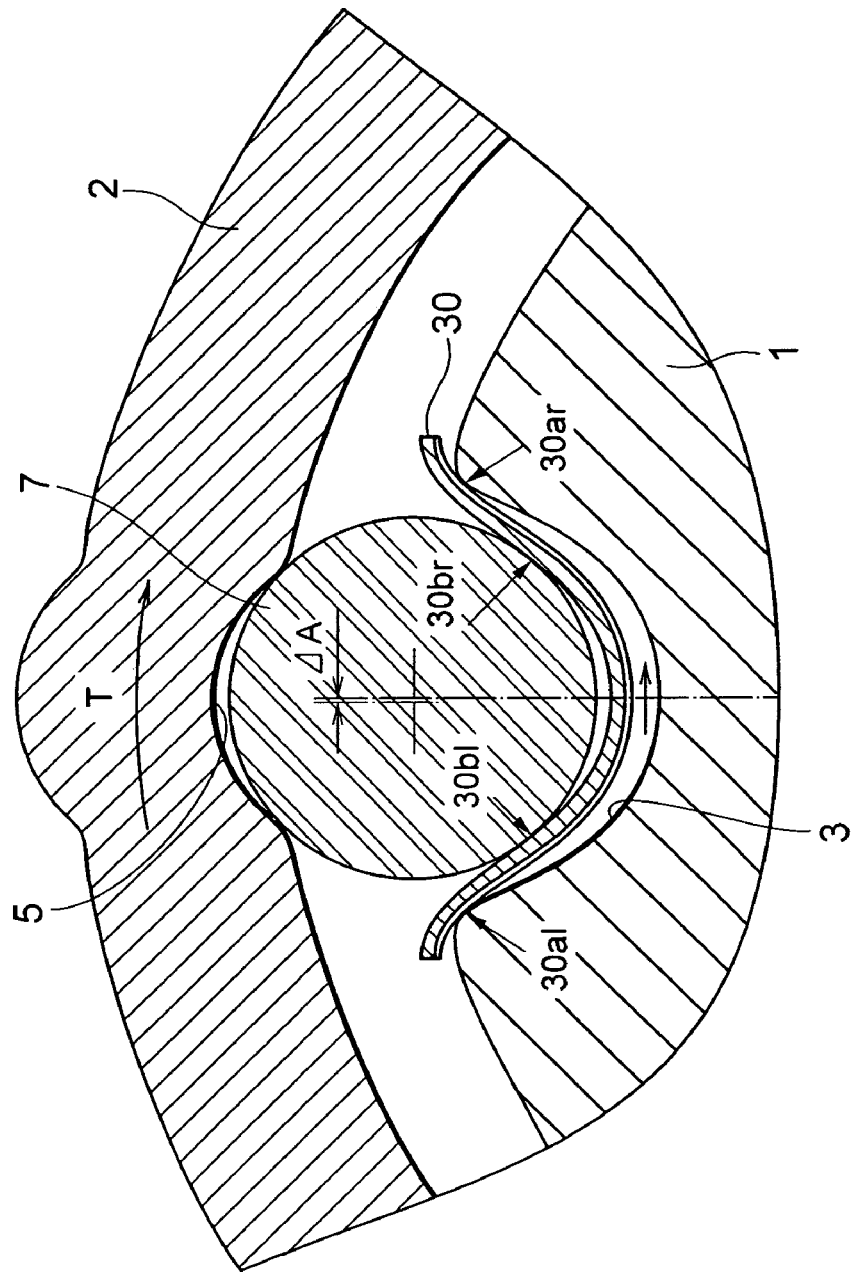
FIG. 27 is a cross sectional view of a principal portion of the telescopic shaft for the vehicle steering in the prior art.
Figure 28:
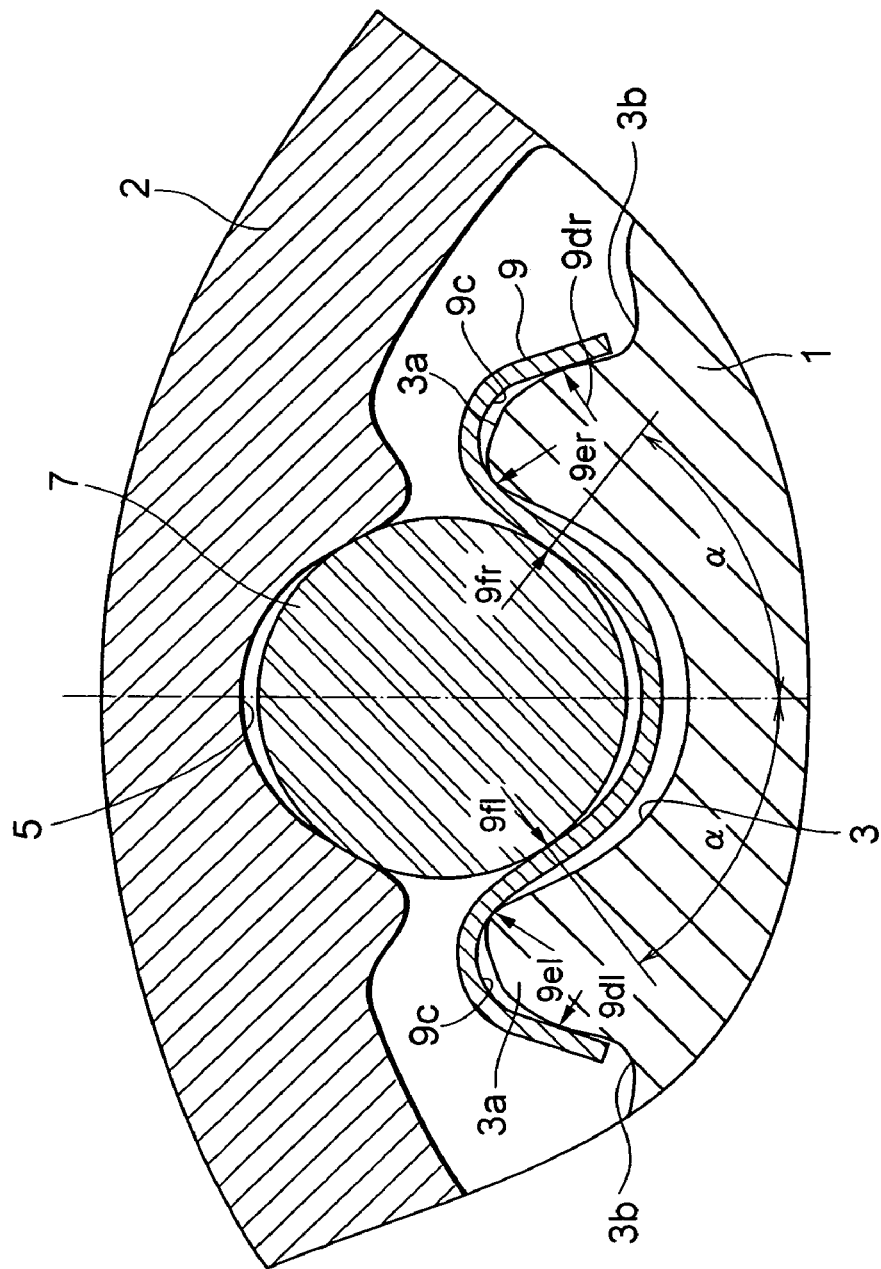
FIG. 28 is a cross sectional view of a principal portion of the telescopic shaft for the vehicle steering in a ninth embodiment of the present invention.
Figure 29:
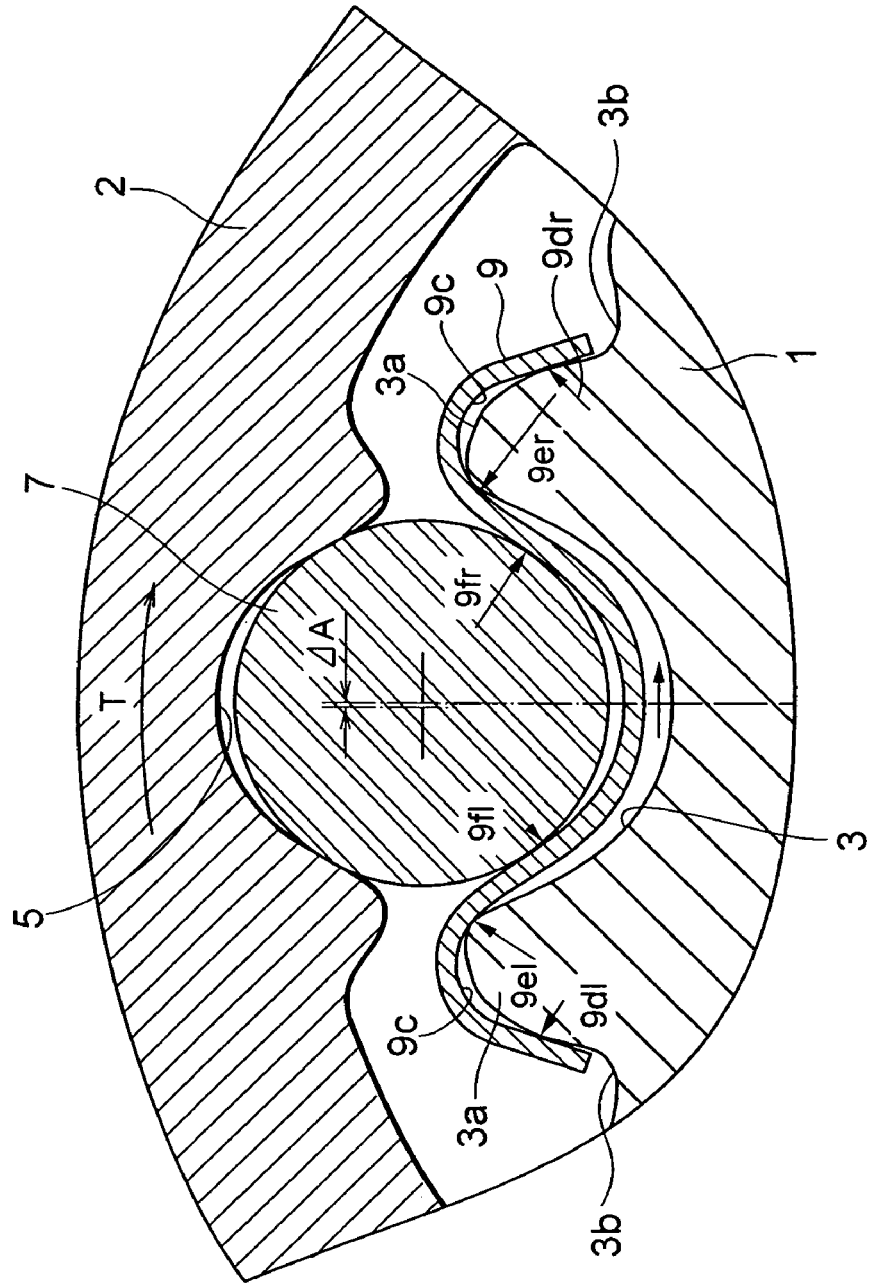
FIG. 29 is a cross sectional view of the principal portion of the telescopic shaft for the vehicle steering illustrated in FIG. 28, showing an operation thereof.
Figure 30A:
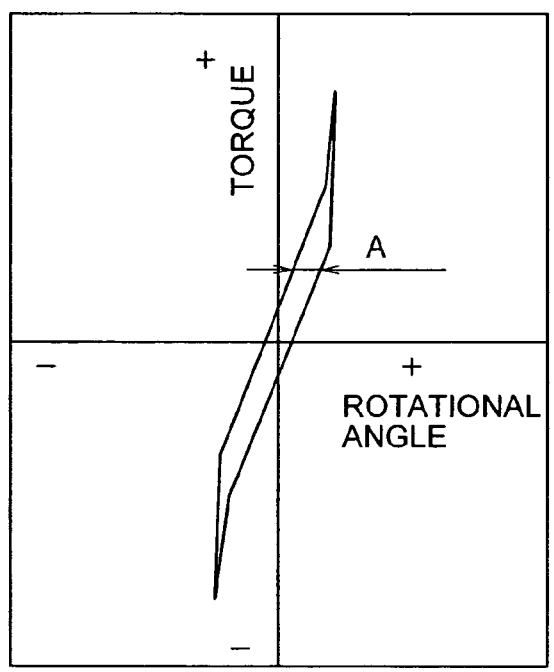
FIG. 30A is a graph showing a relationship between the rotational angle and the torque of the telescopic shaft in the prior art.
Figure 30B:
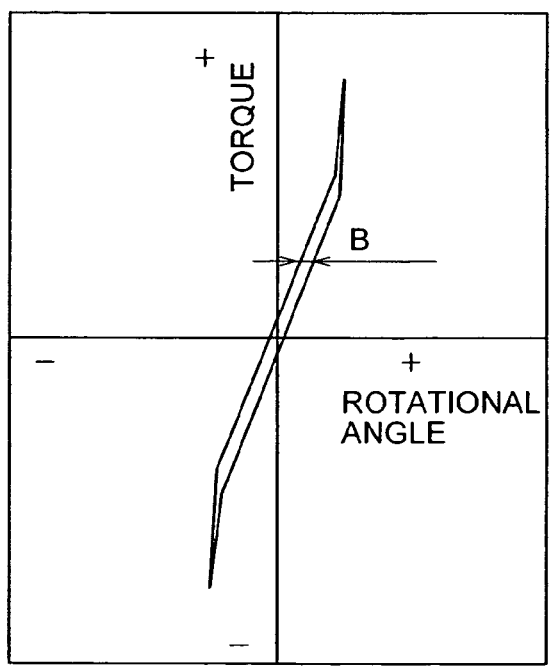
FIG. 30B is a graph showing a relationship between the rotational angle and the torque of the telescopic shaft in the ninth embodiment.

FIG. 27 is a cross sectional view of a principal portion of the telescopic shaft for the vehicle steering in the conventional example as shown in FIG. 7 in DE3730393. FIG. 28 is a cross sectional view of a principal portion of the telescopic shaft for the vehicle steering in a ninth embodiment of the present invention. FIG. 29 is a cross sectional view of the principal portion of the telescopic shaft for the vehicle steering illustrated in FIG. 28, showing an operation thereof. FIG. 30A is a graph showing a relationship between the rotational angle and the torque of the telescopic shaft in the conventional example. FIG. 30B is a graph showing a relationship between the rotational angle and the torque of the telescopic shaft in the ninth embodiment.

As a technical background for the ninth embodiment, for example, in the case of a pre-loading mechanism based on a configuration of the plate spring in the conventional example shown in FIG. 27, the male shaft 1 is fixed, and, when a torque T is inputted from the female shaft 2, the ball 7 is pushed strong against a contact point 30*br* with a plate spring 30. At this time, the plate spring 30 moves with a slight deviation along on the male shaft 1 in a torque-applied direction. Then, the plate spring 30 acts to transfer the torque T while receiving strong reaction at a contact point 30*ar* between the plate spring 30 and the male shaft 1. The plate spring 30 also abuts on another contact point 30*a*1 with the male shaft 1 but is pushed strong against the contact point 30*ar*. When reversing the input torque T from this state, the ball 7 begins to move in the opposite direction, however, the plate spring 30 works, because of a friction with the male shaft 1, to stay in that position. With a further increase in torque, when the ball 7 moves, the contact points 30*b*1 and 30*a*1 abut strong on each other. Note that ΔA represents a quantity of movement of the ball 7 when loaded with the torque T in FIGS. 27 and 29.

FIG. 30A shows how this phenomenon is graphed. The same torsion rigidity is not shown consistently when the torque is applied in the forward direction and when applied in the reversed direction, and a hysteresis quantity A occurs. If this hysteresis is large, a respondency to steering declines.

Under such a circumstance, according to the ninth embodiment, as in the first embodiment, grooved portions 3*b*, 3*b* are formed extending in parallel with the groove 3 in the axial direction on both sides of the axial groove 3 of the male shaft 1, and stepped portions 3*a*, 3*a* are formed between the axial groove 3 and the grooved portions 3*b*, 3*b*. Both side ends of the elastic member 9 taking substantially the M-shape in section extend respectively down to bottoms of the grooved portions 3*b*, 3*b*, and its front side portions abut on the stepped portions 3*a*, 3*a* so as to pinch these stepped portions 3*a*, 3*a*, respectively. Thus, concave portions 9*c*, 9*c* of the elastic member 9 engage with the stepped portions 3*a*, 3*a* provided on both sides of the axial groove 3 of the male shaft 1, whereby the whole of the elastic member 9 is unable to move in the peripheral direction when transmitting the torque.

The elastic member 9 is thus formed and is therefore capable of, in the telescopic shaft utilized for the steering shaft for the automobile, restraining over the long period of time the emission of the heterogeneous sounds and the decline in the steering feeling that are caused by the backlash in the rotating direction. Besides, in the case of applying the torque alternately clockwise and counterclockwise in the rotating direction of the shaft, for the purpose of simply providing a less-hysteresis structure at a low cost, what is characteristic of the elastic member 9 provided with the pre-loading function is to have both of a function of generating the pre-loads in the radial direction and in the peripheral direction in a way that abuts at a certain fixed contact angle on, e.g., the spherical member 7 as the first torque transmitting member, and a function of generating the pre-load only in the peripheral direction.

It is desirable that the aforementioned elastic member 9 be the plate spring 9. The method of utilizing the plate spring 9 as the pre-loading mechanism as in the ninth embodiment has hitherto existed, however, the characteristic thereof was not at such a level as to satisfy its performance as the steering shaft. The reason for this lies in a problem about the hysteresis occurred in the case of giving the torque clockwise and counterclockwise in the rotating direction of the shaft.

In the ninth embodiment, as described above, the plate spring 9 is characterized by such a configuration as to have both of the function of generating the pre-loads in the radial direction and in the rotating direction in a way that abuts at a certain fixed contact angle on the spherical member 7 and the function of generating the pre-load only in the rotating direction, thereby providing the structure capable of minimizing the hysteresis even in the case of reversing the torque as shown in FIGS. 28, 29 and 30B.

As illustrated in FIG. 28, when the torque is not given, the reaction (pre-load) acts on the plate spring 9 evenly on the right and left sides with the ball 7 centered. There act reactions 9*er* (9*el*) and 9*dr* (9*dl*) equilibrated with points 9*fr* (9*fl*) on which the spherical member 7 abuts. At this time, as shown in FIG. 29, the male shaft 1 is fixed, and, when the torque T is inputted from the female shaft 2, the spherical member 7 is pushed strong against the contact point 9*fr* with the plate spring 9. At this moment, the spherical member 8 works to transmit the torque T while receiving the reaction strong at the contact point 9*er* between the plate spring 9 and the male shaft 1.

Simultaneously, the reaction of the contact point 9*dl* between the plate spring 9 and the male shaft 1 increases. This reaction becomes a force acting to move the spherical member 7 back to the center. When reversing the input torque from this state, the plate spring 9 spontaneously works to return to the original position by dint of the reaction generated at the contact point 9*dl*. A characteristic that the hysteresis is extremely small can be obtained even when reversing the torque with the action of this centering function.

FIG. 30B is a graph showing this characteristic. Hystereses A and B have a relationship such as A>B, wherein it is possible to keep a state in which the responding performance when steering is extremely good.

As described above, the plate spring 9 is formed to have in combination the function of generating the pre-loads in the radial direction and in the rotating direction in a way that abuts at a certain fixed contact angle on the spherical member 7 and the function of generating the pre-load only in the rotating direction, whereby the characteristic of the extremely good respondency when steering can be obtained.

Tenth Embodiment

Figure 31A:
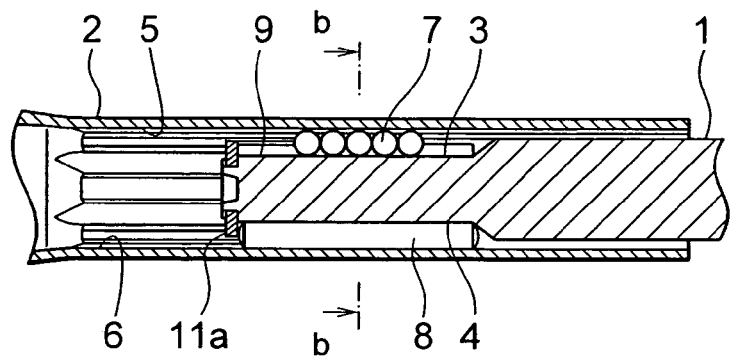
FIG. 31A is a vertical sectional view of the telescopic shaft for the vehicle steering in a tenth embodiment of the present invention.
Figure 31B:
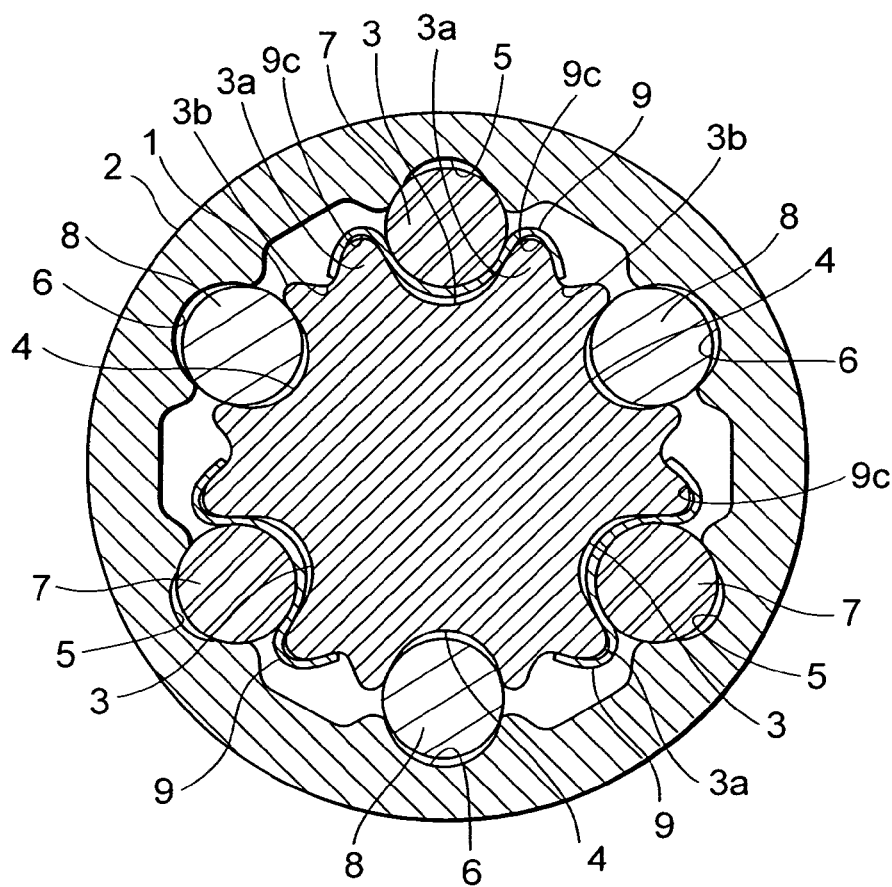
FIG. 31B is a cross sectional view taken along the line b-b in FIG. 31A.
Figure 32:
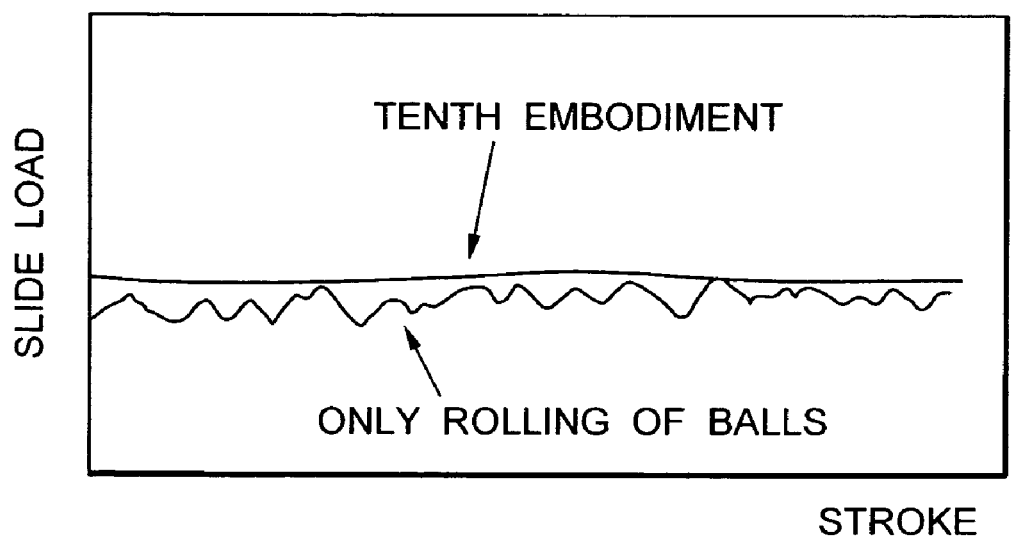
FIG. 32 is a graph showing a relationship between a stroke and a slide load in the tenth embodiment.

FIG. 31A is a vertical sectional view of the telescopic shaft for the vehicle steering in a tenth embodiment of the present invention. FIG. 31B is a cross sectional view taken along the line b-b in FIG. 31A. FIG. 32 is a graph showing a relationship between a stroke and a slide load in the tenth embodiment.

In the first embodiment discussed above, the one pair of first torque transmitting members 7 are disposed in the one pair of axial grooves 3, 5, and the two pieces of second torque transmitting members 8 are disposed in the two pairs of axial grooves 4, 6 arranged at the equal interval of 120 degrees in the peripheral direction with respect to the one pair of axial grooves 3, 5.

By contrast with this arrangement, according to the tenth embodiment, the spherical members 7 as the first torque transmitting members are disposed in the three pairs of axial grooves 3, 5 arranged at the equal interval of 120 degrees in the peripheral direction respectively through the plate springs 9 as the elastic members, thus structuring the first torque transmitting device. The cylindrical members 8 as the second torque transmitting members are disposed between those three pairs of axial grooves 3, 5, thus structuring the second torque transmitting device. Note that the second torque transmitting members 8, it is preferable, be disposed respectively at the central portions in the peripheral direction between the three pairs of axial grooves 3, 5 described above.

The tenth embodiment exhibits the following operations and effects.

A case where the torque is not applied: The plate springs 9 and the spherical members 7 are interposed between the male shaft 1 and the female shaft 2, and the pre-load is always applied, thereby maintaining the no-backlash state. In this state, when extended or contracted in the axial direction, there occur the rolling of the spherical members 7 and the sliding of the cylindrical members 8. A this time, the slide load depends mainly on the rolling of the spherical members 7. The cylindrical members 8 slide between the male shaft 1 and the female shaft 2 in a way that slightly is in contact with the male shaft 1 and the female shaft 2.

A case where a small torque is applied: A contact pressure between the male shaft, the plate springs 9, the spherical members 7 and the female shaft 2 gradually rises as the torque is increasingly applied. With this rise, the plate springs 9 start becoming flexural in the rotating direction. As the plate springs 9 become flexural in the rotating direction, a contact pressure between the male shaft 1, the cylindrical members 8 and the female shaft 2 gradually rises. When slid in this state, the contact pressure relative to the cylindrical members 8 has become larger than in the state where the torque was not applied, and hence the slide load also increases slightly. Note that a contact pressure large enough to cause an indentation by the spherical members 7 is produced neither on the plate spring 9 nor on the female shaft 2 in this state. For example, under a condition that a torque equal to or smaller than approximately 5 Nm is applied from a state where the torque is zero, the load applied on the spherical members 7 is larger than the load on the cylindrical members 8, the characteristic of the torsion rigidity is influenced by spring constants of the plat springs 9.

A case where a large torque is applied: When the large torque is applied, the torque is received mainly between the male shaft 1, the cylindrical members 8 and the female shaft 2, and therefore the contact pressure produced between the male shaft 1, the plate springs 9, the spherical members 7 and the female shaft 2 does not rise so much. The contact between the male shaft 1, the cylindrical members 8 and the female shaft 2 is the line-contacts (which are precisely defined as elongate ellipse contacts) and is therefore capable of enduring load that is by far larger than the point-contacts through the spherical members 7. When slid in this state, the contact pressure through the cylindrical member 8 increases, so that the slide load becomes larger than in the state where the small torque is applied. In case a torque exceeding approximately 5 Nm is applied, the function of surely transmitting the torque is preferential to the extending/contracting function. It may be said that a sufficient slide performance is provided if viewing in terms of the extending/contracting function and the torque transmitting function with no backlash that are required of the telescopic shaft for the vehicle steering.

According to the tenth embodiment, as shown in FIG. 32, a highly advantageous point to be given herein is that the fluctuation in slide load is small over the entire torque area. In any structures disclosed in, for instance, German Patent Application Laid-Open Publication DE3730393A1, if schemed to obtain the high rigidity in the peripheral direction with the peripheral backlash eliminated, the large pre-load must be applied, and it follows that the slide load fluctuates at the ball rolling cycle. A disadvantageous point is that this fluctuation causes an unpreferable feeling of steering as the shaft for the vehicle steering. Unlike this, according to the tenth embodiment, the cylindrical members 8 exhibiting the highly good slide characteristic are employed compositely with the balls 7, thereby making it possible to restrain the torque fluctuations due to the rolling of the balls 7 while restraining the rise in the slide load.

Further, in the construction disclosed in German Patent Application Laid-Open Publication DE3730393A1, if schemed to ensure the high rigidity in the radial direction (right-angled to the axis), a length to which the balls are interposed must be taken long, and this is disadvantageous because of a limit in space. Besides, in the case of the construction in this Publication, the male shaft is liable to fall down about the balls interposed, and there is such a disadvantageous point that this characteristic produces the unpreferable feeling of steering as the telescopic shaft for the vehicle steering. According to the tenth embodiment, since the cylindrical members 8 are interposed over the entire area of the range where the spherical members 8 make the reciprocating motions, the rigidity in the radial direction can be ensured at a high level.

Superiority as the equi-disposed structure by every three trains: Trains of the spherical members 7 plus the plate springs 9 are equally arranged in three positions, whereby the male shaft 1 comes to a state of being afloat from the female shaft 2. Accordingly, when the torque is applied, axial centers of the male shaft 1 and the female shaft 2 move to positions where the shafts 1 and 2 are balanced best with each other. For example, even if the male shaft 1, in the assembled state, becomes a bit eccentric from the female shaft 2, the two shafts 1 and 2 work to become concentric as the torque is applied. Hence, when the torque is applied, the stable torsion rigidity is obtained at all times. Moreover, the cylindrical members 8 are disposed between the trains of spherical members 7, and hence the advantage is that the cylindrical members 8 receive the load with a good balance on the occasion of receiving the torque.

In a comparison between the tenth embodiment and the first embodiment, according to the tenth embodiment, the torque on which the pre-load by the plate spring 9 acts falls within a range of 0 through approximately ±5 Nm. By contrast, the first embodiment does not particularly disclose any numerical value of the torque which the pre-load acts on.

The tenth embodiment has a characteristic of being capable of transmitting a much larger torque than in the first embodiment. According to the first embodiment, the torque that may not cause the spherical members 7 to generate a load of excessive contact pressure upon the action of the pre-load, is on the order of 2 Nm at the largest. If the torque is increased over 2 Nm, the excessive contact pressure is applied. An excessive contact pressure is applied also to the spherical members 7 with the result that the spherical members 7 might be indented, and the slide function is deteriorated. As compared with this, according to the tenth embodiment, the spherical members 7 and the cylindrical members 8 are equally arranged by three trains alternately with the well-balanced layout, and hence the torque transfer by the pre-load can be increased up to 5 Nm without bringing about any rise in slide load.

In the tenth embodiment, for the same reason, the cylindrical members 8 abut strong before the plate springs 9 become flexural to the end, thereby making is feasible to restrain the contact pressure of the spherical members 7 and to set the maximum transmitting torque larger than in the first embodiment.

It is preferable that the spherical members 7 be the balls. Further, it is preferable that the cylindrical members 8 be the needle rollers.

Eleventh Embodiment

Figure 33A:
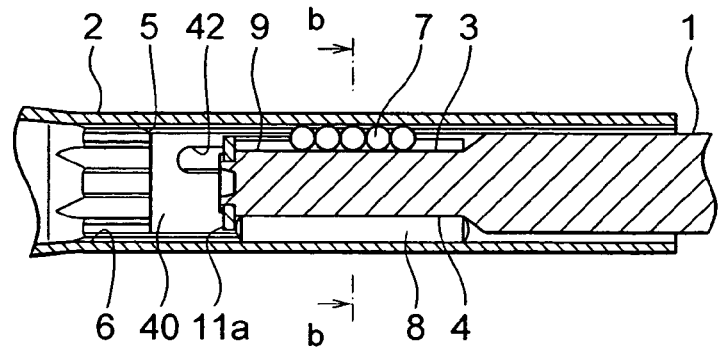
FIG. 33A is a vertical sectional view of the telescopic shaft for the vehicle steering in an eleventh embodiment of the present invention.
Figure 33B:
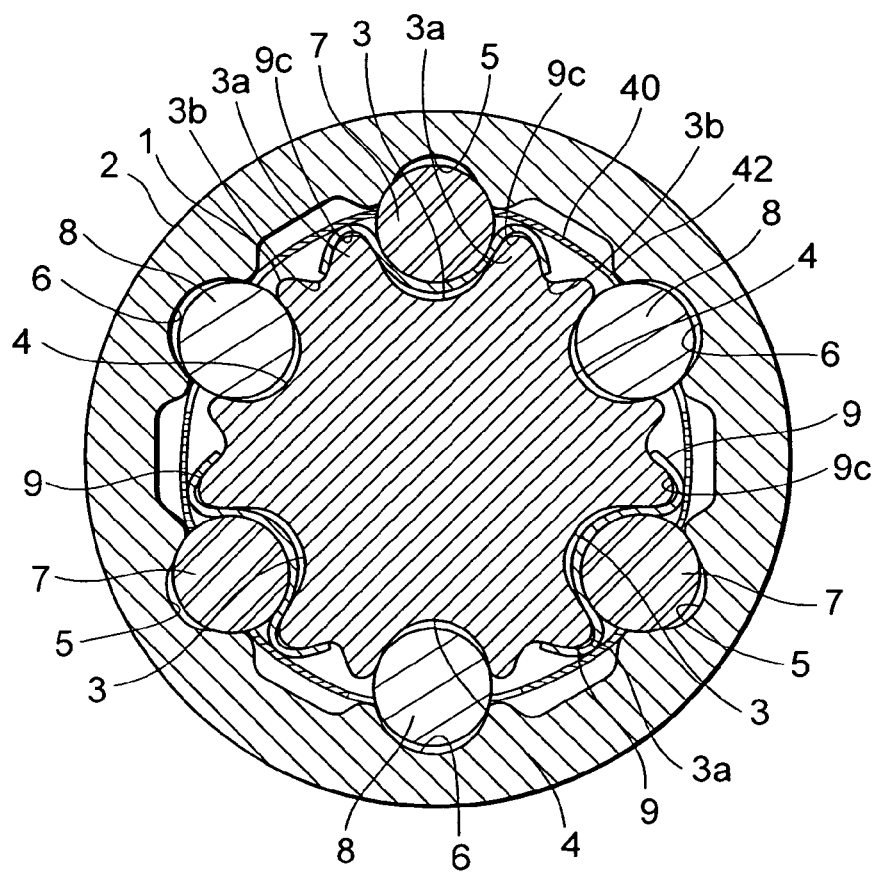
FIG. 33B is a cross sectional view taken along the line b-b in FIG. 33A.
Figure 34A:
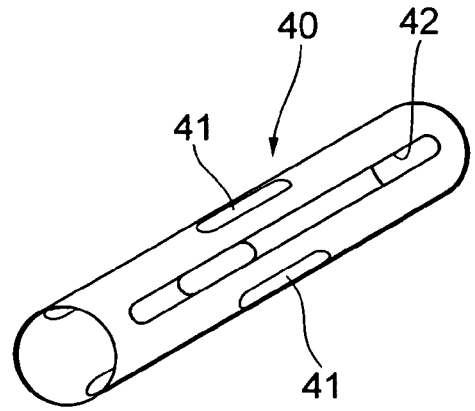
FIG. 34A is a perspective view of a holder shown in FIG. 33.
Figure 34B:
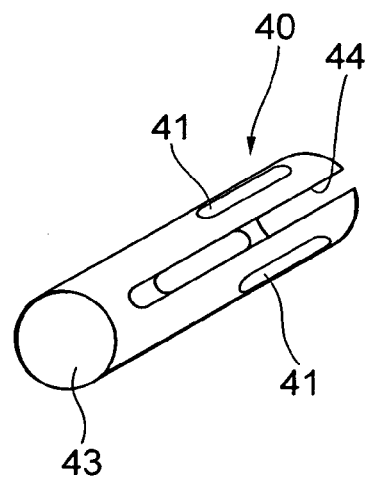
FIGS. 34B and 34C are respectively perspective views of the holder in examples of the eleventh embodiment.
Figure 34C:
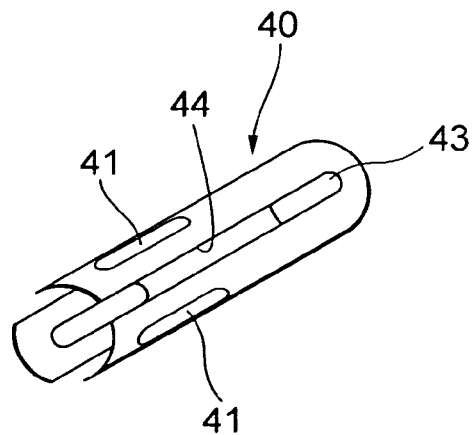
Figure 35A:
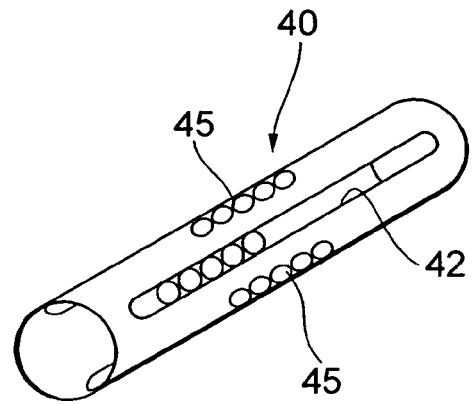
FIGS. 35A, 35B and 35C are respectively perspective views of the holder in examples of the eleventh embodiment.
Figure 35B:
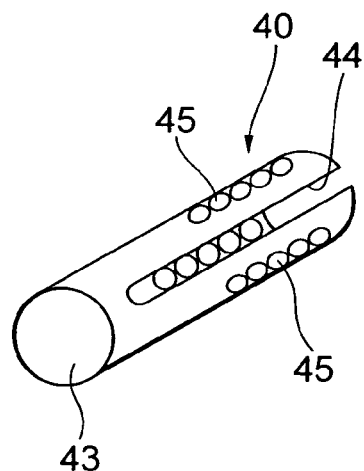
Figure 35C:
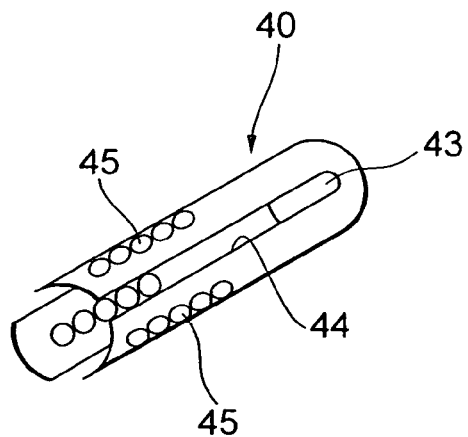

FIG. 33A is a vertical sectional view of the telescopic shaft for the vehicle steering in an eleventh embodiment of the present invention. FIG. 33B is a cross sectional view taken along the line b-b in FIG. 33A. FIG. 34A is a perspective view of a holder shown in FIG. 33. FIGS. 34B and 34C are respectively perspective views of the holder in examples of the eleventh embodiment. FIGS. 35A, 35B and 35C are respectively perspective views of the holder in examples of the eleventh embodiment.

As a technical background for the eleventh embodiment, according to the tenth embodiment discussed above, when slid, all peripheral speeds of the spherical members 7 defined as the first torque transfer members are not the same because of an influence of a difference of how much the pre-load is applied. Therefore, upon a start of sliding, relative positions of the individual spherical members 7 change, and there occur such a phenomenon that the spherical members 7 abut on each other and gaps between these member 7 are formed. In the state where no holder is provided, this phenomenon occurs, and the slide resistance tends to increase or fluctuate.

As in the tenth embodiment discussed above, in the case of having the composite function of the spherical members 7 and the cylindrical members, an average slide load itself can be set slightly larger than in the case of only the rolling, however, since there is very few influence on the slide load due to the phenomenon described above, there is not particularly a problem in terms of the function even if the holder is not provided.

For obtaining more stable slide load, however, it is preferable that the spherical members 7 be held by the holder.

Under such a circumstance, according to the eleventh embodiment, a holder 40 for holding the spherical members 7 in a rollable manner without interfering with the cylindrical members 8, is disposed between the male shaft 1 and the female shaft 2.

In the eleventh embodiment, as shown in FIGS. 33A and 33B, the first torque transmitting device is structured such that the spherical members 7 as the first torque transmitting members are disposed in the three pairs of axial grooves 3, 5 equally disposed at the interval of 120 degrees in the peripheral direction through the plate springs 9 as the elastic members. Then, in the second torque transfer device, the cylindrical members 8 as the second torque transmitting members are disposed respectively in the axial grooves 4, 6 at the central portions in the peripheral direction between those three pairs of axial grooves 3, 5.

As illustrated in FIGS. 33A, 33B and 34A, the holder 40 for holding the spherical members 7 in the rollable manner without interfering with the cylindrical members 8, is disposed between the male shaft 1 and the female shaft 2.

This holder 40 taking a cylindrical shape has three pieces of elongate holes 41 for holding the spherical members 7 in the rollable manner, and also has interference avoiding elongate holes 42, formed in positions corresponding to the cylindrical members 8, for avoiding the interference with the cylindrical members 8. The interference avoiding elongate holes 42 are formed by far longer in the axial direction than the elongate holes 41.

Further, in the example in FIG. 34B, the holder 40 takes the bottomed cylindrical shape, wherein a wall portion 43 is provided at one end thereof, and an interference avoiding open slits 44 opened at the other end thereof are formed in addition to the three pieces of elongate holes 41.

In the example in FIG. 34C, the holder 40 takes the bottomed cylindrical shape, wherein the wall portion 43 is provided at the other end thereof, and the interference avoiding open slits 44 opened at one end thereof are formed in addition to the three pieces of elongate holes 41.

In the example in FIG. 35A, the holder 40 taking the cylindrical shape has three sets of pluralities of round holes 45 for holding the spherical members in the rollable manner, and also has interference avoiding elongate holes 42, formed in positions corresponding to the cylindrical members 8, for avoiding the interference with the cylindrical members 8.

In the example in FIG. 35B, the holder 40 takes the bottomed cylindrical shape provided with the wall portion 43 at one end, and has the interference avoiding open slits 44 opened at the other end thereof in addition to the three sets of pluralities of round holes 45.

In the example in FIG. 35C, the holder 40 takes the bottomed cylindrical shape provided with the wall portion 43 at the other end, and has the interference avoiding open slits 44 opened at one end thereof in addition to the three sets of pluralities of round holes 45.

From the above-mentioned, according to the eleventh embodiment, both of the spherical members 7 and the cylindrical members 8 exist on the same axial section, and nevertheless the spherical member 7 can be held, whereby the slide function can be improved (the slide load can be stabilized). As a result, a comfortable steering feeling can be obtained.

It is preferable that the spherical members 7 be the balls Further, it is preferable that the cylindrical members 8 be the needle rollers.

(Other Related Items)

The following items are, it can be said, applied to the whole of the embodiments of the present invention. When two pieces of cylindrical members 8 are disposed on the male shaft 1, the cylindrical members 8 may be made fixed to the male shaft 1 to secure the cylindrical members 8 to the male shaft 1 by caulking the surface of the male shaft 1 in the vicinity of the cylindrical members 8. The holder and the rolling members are held so as not to be separated from each other, whereby the assembly may also be facilitated. The male shaft is prevented from being pulled out by caulking inwards the front side end of the female shaft, whereby a non-decomposable structure may thus be provided. The cylindrical members 8, 14 and the spherical members 7, which have undergone a thermal treatment and have been polished, may also be used. There may further be used the cylindrical member 8 of which the surface has been subjected to a resin layering process of a resin containing PTFE (polytetrafluoroethylene) or molybdenum disulfide. The male shaft 1 manufactured by cold drawing from a solid or hollowed steel product, may also be available. The male shaft 1 manufactured by cold drawing from an aluminum material, may further be available. The male shaft 1 manufactured by cold forging from a solid steel product or an aluminum material, may still further be available. The female shaft 2 manufactured by cold drawing molding from a hollowed steel product, may also be available. On the occasion of performing the cold forging of the male shaft, it is desirable that a metallic soap process (bonderizing process) be effected on the material. The female shaft may be made from the hollowed steel product as a material, wherein the steel product may, after undergoing the metallic soap process (bonderizing process), be subjected to a pipe-contracting or expanding work to a diameter required, and the grooves may be formed by press forming. The female shaft 2 may undergo nitriding. There may further be used the female shaft 2 of which the surface has been subjected to the resin layering process of a resin containing PTFE (polytetrafluoroethylene) or molybdenum disulfide.

Moreover, it is desirable that the ranges of the following numerical values be used in all of the embodiments of the present invention.

A diameter of the ball as the spherical member is on the order of Φ3 mm through Φ6 mm in the application of being used for the automobile.

A diameter of the needle roller as the cylindrical member is on the order of Φ3 mm through Φ6 mm.

A P.C.D ratio of the ball diameter to the ball and the needle roller is approximately 1:3.5 through 5.0.

As the torsion strength required of the automobile is generally equal to or larger than 250 Nm, a diameter of the male shaft is equal to or larger than 13 mm in the case of using a carbon steel for a general mechanical structure.

In the state where the torque is not applied, a ball contact pressure is equal to or smaller than 1500 MPa.

In a state where a torque on the order of 100 Nm is applied, the ball contact pressure is equal to or smaller than 2000 MPa.

In the state where the torque on the order of 100 Nm is applied, the needle roller contact pressure is equal to or smaller than 2000 MPa.

A ratio of a plate thickness of the plate spring to the ball diameter is approximately 1:10 through 20.

It can be said that the present invention exhibits the following advantages as compared with the conventional products.

The cost is low.

The stable low slide load can be obtained.

No backlash is caused.

The anti-abrasion characteristic is excellent.

The heat resistance is excellent.

The weight can be reduced.

The mechanism is small.

There is the flexibility to any using conditions without changing the design concept.

Note that each of Japanese Patent Application Laid-Open Publication No. 2001-50293 and German Patent Application Laid-Open Publication DE3730393A1 discloses the structure that the pre-load is applied by the elastic member, wherein the plurality of balls are interposed between in the axial grooves formed in the male shaft and in the female shaft. By contract, the present invention, as described above, is by far more excellent than in [the case of taking the all-line ball rolling structure] or [the case of taking the conventional spline-fitting].

Moreover, European Patent Application Laid-Open Publication EP1078843A1 discloses a structure that the backlash is prevented by a regulator for preventing the backlash in cooperation with the needle roller and the holder thereof, however, this is a pure sliding structure, and hence the pre-load can not be increased. It is therefore extremely difficult to prevent the backlash over a long period of time and to acquire the high rigidity.

In contrast with this, the present invention, as described above, partially adopts the rolling structure, has the different backlash preventing means, and therefore exhibits the following excellent points.

The slide load can be restrained low because of the low frictional resistance.

The pre-load can be increased, and it is possible to simultaneously attain the prevention of the backlash over the long period of time and the high rigidity.

As discussed above, according to the present invention, the first torque transmitting device is constructed such that the spherical members as the first torque transmitting members are interposed between in the pair of axial grooves formed in the outer peripheral surface of the male shaft and in the inner peripheral surface of the female shaft through the elastic members for pre-loading; and the second torque transmitting device is constructed such that the cylindrical members as the second torque transmitting members are interposed respectively between in the two pairs of other axial grooves formed in the outer peripheral surface of the male shaft and in the inner peripheral surface of the female shaft.

When the torque is not transmitted, with the spherical members and the cylindrical members used, the elastic members applies the pre-load to the spherical members and the cylindrical members against the female shaft to such an extent as to cause no backlash, thereby making it feasible to surely prevent the backlash caused between the male shaft and the female shaft and enabling the male shaft and the female shaft to slide in the axial direction with the stable slide load without any backlash.

When the torque is transmitted, the elastic member is structured to restrict the spherical member and the cylindrical member in the peripheral direction, whereby the torque can be transmitted in the high-rigidity state by surely preventing the rotation-directional backlash between the male shaft and the female shaft.

Note that the embodiments of the present invention have exemplified the balls as the spherical members, the needle rollers as the cylindrical members and the plate springs as the elastic members, but is not limited to those members. Further, the present invention is not confined to the embodiments discussed above and can be modified in a variety of forms.

What is claimed is:

1. A telescopic shaft for vehicle steering, assembled into a steering shaft of a vehicle and having a male shaft and a female shaft that are so fitted to each other to be able to transmit torque therebetween and move in an axial direction relative to each other, comprising:
a first torque transmitting device having:
a first interposing portion with a first axial groove and a second axial groove respectively provided in an outer peripheral surface of said male shaft and in an inner peripheral surface of said female shaft, first torque transmitting members including a plurality of spherical members disposed in the first and second axial grooves of said first interposing portion and rolling when said male shaft and said female shaft make relative movements in the axial direction, and an elastic member disposed adjacent in a radial direction to said first torque transmitting members in said first interposing portion, restricting said first torque transmitting members when a torque is transmitted between said male shaft and said female shaft and applying a pre-load to said male shaft and said female shaft through said first torque transmitting members when torque is not transmitted between said male shaft and said female shaft; and a second torque transmitting device having:
a second interposing portion with a third axial groove and a fourth axial groove respectively provided in the outer peripheral surface of said male shaft and in the inner peripheral surface of said female shaft, and a second torque transmitting member including a cylindrical member disposed in said second interposing portion such that the cylindrical member extends parallel to both said male shaft and said female shaft, and sliding when said male shaft and said female shaft make the relative movements in the axial direction, wherein the first and second torque transmitting devices are arranged such that, in a first range of torque, torque is transmitted between said male shaft and said female shaft by the first torque transmitting members but not the second torque transmitting member, and, in a second range of torque greater than said first range, the second torque transmitting member acts to transmit torque between said male shaft and said female shaft.

2. A telescopic shaft for vehicle steering according to claim 1, wherein said first torque transmitting device and said second torque transmitting device are disposed in positions different in a circumferential direction between said male shaft and said female shaft.

3. A telescopic shaft for vehicle steering according to claim 1, comprising a plurality of first torque transmitting devices and a plurality of second torque transmitting devices, the third and fourth grooves of each second torque transmitting device being disposed, in a circumferential direction, between adjacent pairs of first torque transmitting devices.

4. A telescopic shaft for vehicle steering according to claim 1, wherein said elastic member is a plate spring.

5. A telescopic shaft for vehicle steering according to claim 1, wherein each of the first through fourth axial grooves includes a shallow portion and a deep portion, the shallow portion of each groove is formed in a curved-surface shape, the deep portion of each groove is formed in a flat shape, each of said first torque transmitting members abuts on one of the first and second axial grooves in the vicinity of a boundary between the respective curved-surface portion and the respective flat portion, and, in said second range of torque, the second torque transmitting member abuts on each of the third and fourth axial grooves in the vicinity of a boundary between the respective curved-surface portion and the respective flat portion.

6. A telescopic shaft for vehicle steering according to claim 1, wherein said male shaft is provided with a groove end portion for generating a large slide load by restricting said first torque transmitting members from rolling in the axial directions so as to supplementally absorb an impact energy when a collision occurs.

7. A telescopic shaft for vehicle steering according to claim 3, wherein each cylindrical member of said plurality of second torque transmitting devices is disposed with a gap in the respective second interposing portion.

8. A telescopic shaft for vehicle steering according to claim 1, wherein said elastic member abuts on said first torque transmitting members at a contact angle, generates pre-loads in the radial direction and in a circumferential direction when a torque is not inputted to said male shaft and said female shaft, and generates the pre-load in the circumferential direction when the torque is inputted to said male shaft or said female shaft.

9. A telescopic shaft for vehicle steering according to claim 3, wherein said first torque transmitting devices are arranged equally at an interval of 120 degrees in the circumferential direction, and each second torque transmitting devices is disposed between a pair of first torque transmitting devices which are adjacent in the circumferential direction.

10. A telescopic shaft for vehicle steering according to claim 9, wherein each second torque transmitting devices is equally spaced in the circumferential direction between the pair of adjacent first torque transmitting devices.

11. A telescopic shaft for vehicle steering according to claim 1, further comprising a first torque transmitting member holder for holding said first torque transmitting members in a rollable manner.

12. A telescopic shaft for vehicle steering according to claim 11, wherein said holder has an elongate hole or a plurality of round holes extending in the axial direction, and
said first torque transmitting members are disposed in said elongate hole or respectively in said plurality of round holes.

13. A telescopic shaft for vehicle steering according to claim 11, wherein said holder has a cylindrical shape and has an elongate hole extending in the axial direction or a plurality of round holes arranged in the axial direction, and
said first torque transmitting members are disposed in said elongate hole or respectively in said plurality of round holes.

14. A telescopic shaft for vehicle steering according to claim 13, wherein said holder has an interference-avoiding elongate hole or an interference-avoiding open slit opened at an end portion of said holder for avoiding interference with said second torque transmitting device.

15. A telescopic shaft for vehicle steering according to claim 14, wherein a total length of the interference-avoiding elongate hole or of the interference-avoiding open slit is longer than a total length of said elongate hole or a train of said plurality of round holes for holding said first torque transmitting members.

16. A telescopic shaft for vehicle steering according to claim 1, wherein in said second range of torque, torque is transmitted between said male shaft and said female shaft by the first torque transmitting members and the second torque transmitting member.

17. A telescopic shaft for vehicle steering according to claim 1, wherein the cylindrical member is disposed with a gap in said second interposing portion.

18. A telescopic shaft for vehicle steering according to claim 7, wherein each gap is arbitrarily set by properly selecting a diameter for each second torque transmitting member or by combining diameters of said male shaft, said female shaft, and each second torque transmitting member.

* * * * *